(12) United States Patent
Helie et al.

(10) Patent No.: US 9,625,713 B2
(45) Date of Patent: Apr. 18, 2017

(54) LASER REINFORCED DIRECT BONDING OF OPTICAL COMPONENTS

(75) Inventors: David Helie, Quebec (CA); Réal Vallee, Quebec (CA); Fabrice Lacroix, Saint-Louis (FR)

(73) Assignee: Université Laval, Quebec (Quebec) (CA)

( * ) Notice: Subject to any disclaimer, the term of this patent is extended or adjusted under 35 U.S.C. 154(b) by 516 days.

(21) Appl. No.: 13/979,014

(22) PCT Filed: Jan. 10, 2012

(86) PCT No.: PCT/CA2012/000023
§ 371 (c)(1),
(2), (4) Date: Sep. 10, 2013

(87) PCT Pub. No.: WO2012/094737
PCT Pub. Date: Jul. 19, 2012

(65) Prior Publication Data
US 2013/0344302 A1 Dec. 26, 2013

Related U.S. Application Data

(60) Provisional application No. 61/431,177, filed on Jan. 10, 2011.

(51) Int. Cl.
*G02B 27/00* (2006.01)
*B23K 26/00* (2014.01)
(Continued)

(52) U.S. Cl.
CPC .......... *G02B 27/00* (2013.01); *B23K 26/0057* (2013.01); *B23K 26/0063* (2013.01);
(Continued)

(58) Field of Classification Search
CPC ........ Y10T 428/24802; B23K 26/0057; B23K 26/0063; B23K 26/0624
See application file for complete search history.

(56) References Cited

U.S. PATENT DOCUMENTS 5,009,689 A 4/1991 Haisma et al.
7,626,138 B2 * 12/2009 Bovatsek ........... B23K 26/0617
219/121.68
(Continued)

FOREIGN PATENT DOCUMENTS

WO WO2008101699 A2 * 8/2008
WO 2009/131144 A1 10/2009

OTHER PUBLICATIONS

Horn et al., "Investigations on Melting and Welding of Glass by Ultra-short Laser Radiation", Journal of Laser Micro/Nanoengineering vol. 3, No. 2, pp. 114 to 118, 2008.
(Continued)

*Primary Examiner* — Gerard Higgins
(74) *Attorney, Agent, or Firm* — Baker & Hostetler LLP

(57) ABSTRACT

A method for the laser reinforced direct bonding of two optical components having a respective bonding surface and a reinforced optical assembly made thereby are provided. The method includes a first step of assembling the two optical components by direct bonding of their respective bonding surface together, thereby defining a direct-bonded interface therebetween. The method further includes a second step of reinforcing the direct-bonded interface with a weld seam including at least one substantially continuous reinforcing weld line forming a closed shape enclosing a sealed direct-bonded region. Each weld line is inscribed by focusing ultrashort laser pulses at the direct-bonding interface so as to generate non-linear optical phenomena inducing a localized junction between the two optical components. Advantageously, embodiments of the present
(Continued)

invention provide reinforced optical assemblies exhibiting hermetic and mechanically resistant bonds over a large area as well as negligible alteration of their optical transmission properties.

15 Claims, 11 Drawing Sheets

(51) Int. Cl.
| | |
|---|---|
| *B23K 26/06* | (2014.01) |
| *B23K 26/28* | (2014.01) |
| *B29D 11/00* | (2006.01) |
| *B23K 26/32* | (2014.01) |
| *B23K 26/142* | (2014.01) |
| *B23K 26/0622* | (2014.01) |
| *B23K 26/60* | (2014.01) |
| *B29C 65/16* | (2006.01) |
| *B29C 65/00* | (2006.01) |
| *B29L 11/00* | (2006.01) |
| *B23K 103/00* | (2006.01) |

(52) U.S. Cl.
CPC ...... *B23K 26/0624* (2015.10); *B23K 26/0665* (2013.01); *B23K 26/142* (2015.10); *B23K 26/28* (2013.01); *B23K 26/32* (2013.01); *B23K 26/60* (2015.10); *B29D 11/00* (2013.01); *B23K 2203/50* (2015.10); *B29C 65/1635* (2013.01); *B29C 65/1638* (2013.01); *B29C 65/1658* (2013.01); *B29C 66/1122* (2013.01); *B29C 66/232* (2013.01); *B29C 66/24244* (2013.01); *B29C 66/41* (2013.01); *B29C 66/45* (2013.01); *B29L 2011/00* (2013.01); *Y10T 428/24802* (2015.01)

(56) References Cited

U.S. PATENT DOCUMENTS

| 8,778,121 B2* | 7/2014 | Tuennermann ....... C03B 23/203 156/272.8 |
|---|---|---|
| 2007/0051706 A1 | 3/2007 | Bovatsek et al. |
| 2010/0025387 A1 | 2/2010 | Arai et al. |
| 2010/0047587 A1 | 2/2010 | Itoh et al. |
| 2010/0086741 A1 | 4/2010 | Bovatsek et al. |
| 2010/0304151 A1 | 12/2010 | Tuennermann et al. |
| 2011/0113828 A1 | 5/2011 | Matsumoto |
| 2013/0068384 A1 | 3/2013 | Liu et al. |

OTHER PUBLICATIONS

Tamaki et al., "Laser micro-welding of transparent materials by a localized heat accumulation effect using a femtosecond fiber laser at 1558 nm", Optics Express vol. 14, No. 22, pp. 10460 to 10468, 2006.
Watanabe et al., "Direct joining of glass substrates by 1 kHz femtosecond laser pulses", Applied Physics B. vol. 87, No. 1, pp. 85 to 89, 2007.
Watanabe, "Space-selective laser joining of dissimilar transparent materials using femtosecond laser pulses", Applied Physics Letters 89, pp. 158-180, 2006.
Written Opinion of the International Search Authority for PCT/CA2012/000023 mailed Apr. 24, 2012.
Myamoto, I, et al., "Novel Fusion Welding Technology of Glass Using Ultrashort Pulse Lasers", Physics Procedia 5, 2010, pp. 483-493.
Cvecek, K. et al., "Defect Formation in Glass Welding by Means of Ultra Short Laser Pulses", Physics Procedia 5, 2010, pp. 495-502.
Watanabe, W. et al., "Filamentation in Ultrafast Laser Material Processing", Progress in Ultrafast Intense Laser Science VI, 2020, Chapter 9.
Oki, Y. et al., "Exact Evaluation of Joint Force in Ultrafast Microwelding Without the Influence of Contacting Area", Proceedings of LPM2011, 4 pages, 2011.
Roth, S. et al., "Glass Welding Technology Using Ultra Short Laser Pulses", Laser Applications in Microelectronic and Optoelectronic Manufacturing, Proc of SPIE, 11 pages, 2011, vol. 7920.
Richter, S. et al., "Bonding of Glass With Femtosecond Laser Pulses at High Repetition Rates", Applied Physics A, vol. 103, pp. 257-261, Mar. 26, 2011.
Cvecek, K. et al., "Sample Preparation Method for Glass Welding by Ultrashort Laser Pulses Yields Higher Seam Strength", Applied Optics, May 1, 2011, pp. 1941-1944, vol. 50, No. 13.
Helie, D. et al., "Reinforced Direct Bonding of Optical Materials by Femtosecond Laser Welding", Applied Optics 51, 2012, p. 2098-2106.
Helie, D. et al., "Reinforcing a Direct Bond Between Optical Materials by Filamentation Based Femtosecond Laser Welding", Journal of Laser Micro/Nanoengineering, vol. 7, No. 3, 2012, p. 284-292.
Haisma, J. et al., "Contact Bonding, Including Direct-Bonding in a Historical and Recent Context of Materials Science and Technology, Physics and Chemistry", Materials Science and Engineering, R 37, 2002, pp. 1-60.
Haisma, J. et al., "Direct Bonding and Beyond", Applied Optics, vol. 46, No. 27, Sep. 20, 2007, pp. 6793-6803.
Huang, H. et al., "Direct Welding of Fused Silica With Femtosecond Fiber Laser", Laser-based Micro- and Nanopackaging and Assembly VI, Proc. of SPIE, 9 pages, 2012, vol. 8244.
Huang, H. et al., "Ultrashort Pulsed Fiber Laser Welding and Sealing of Transparent Materials", Applied Optics, vol. 51, No. 15, May 20, 2012, pp. 2979-2986.
European Search Report issued in European Patent Application No. 12734092.5 mailed May 6, 2016.
Itoh, "Ultrafast Laser Processing of Glass", JLMN—Journal of Laser Micro/Nanoengineering, vol. 9, No. 3, 2014.

\* cited by examiner

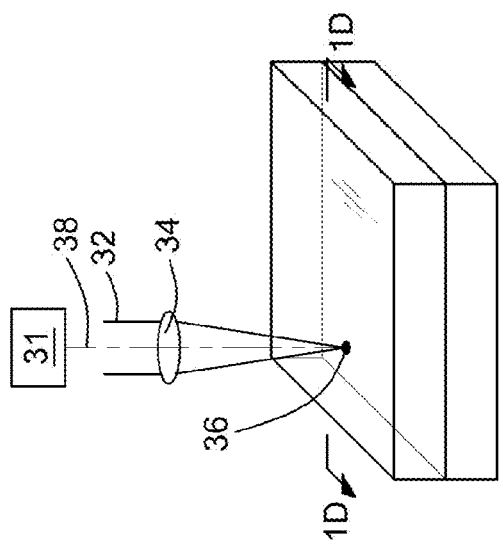
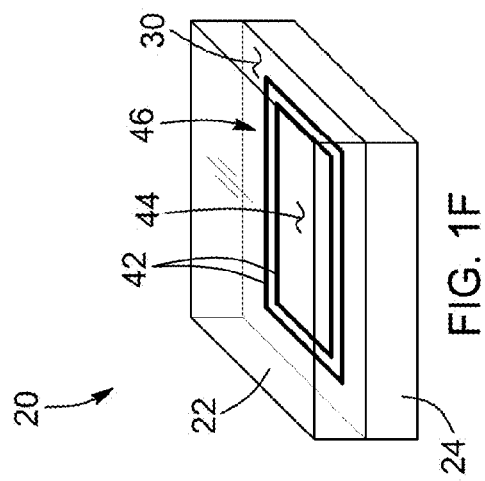
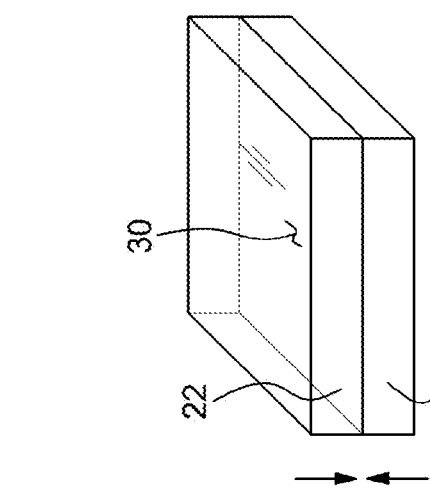
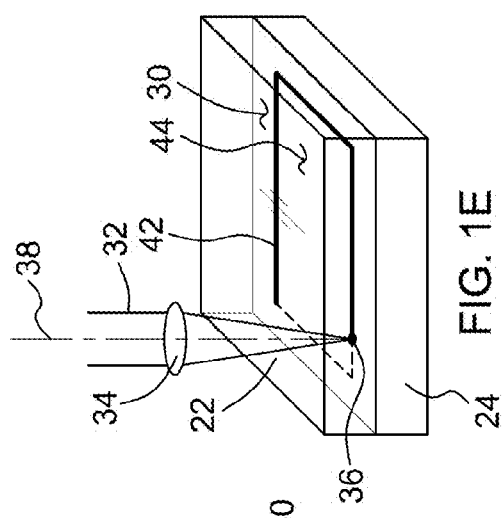
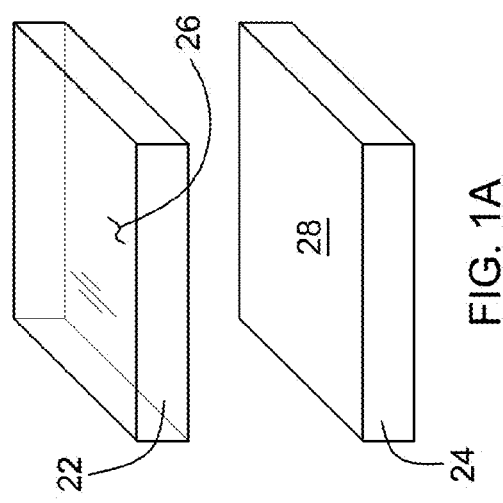
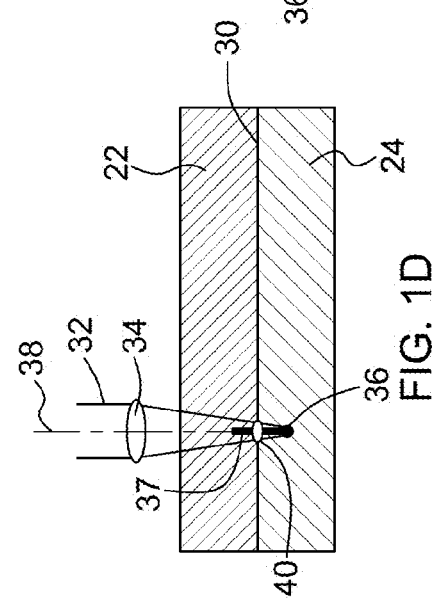

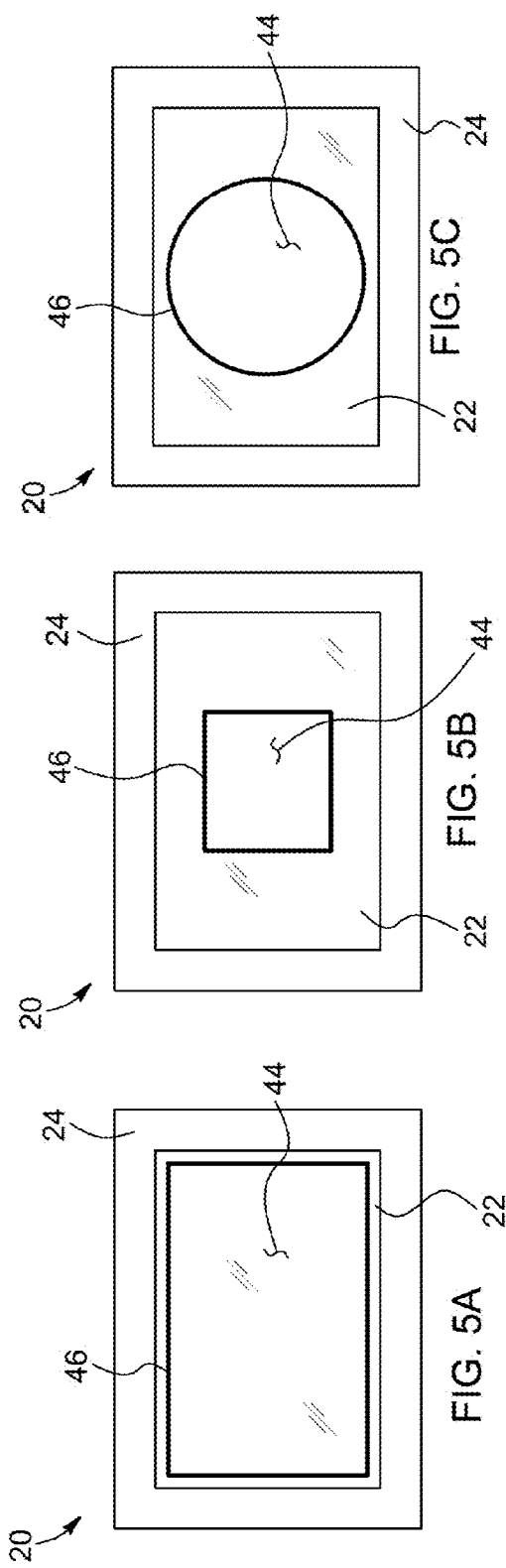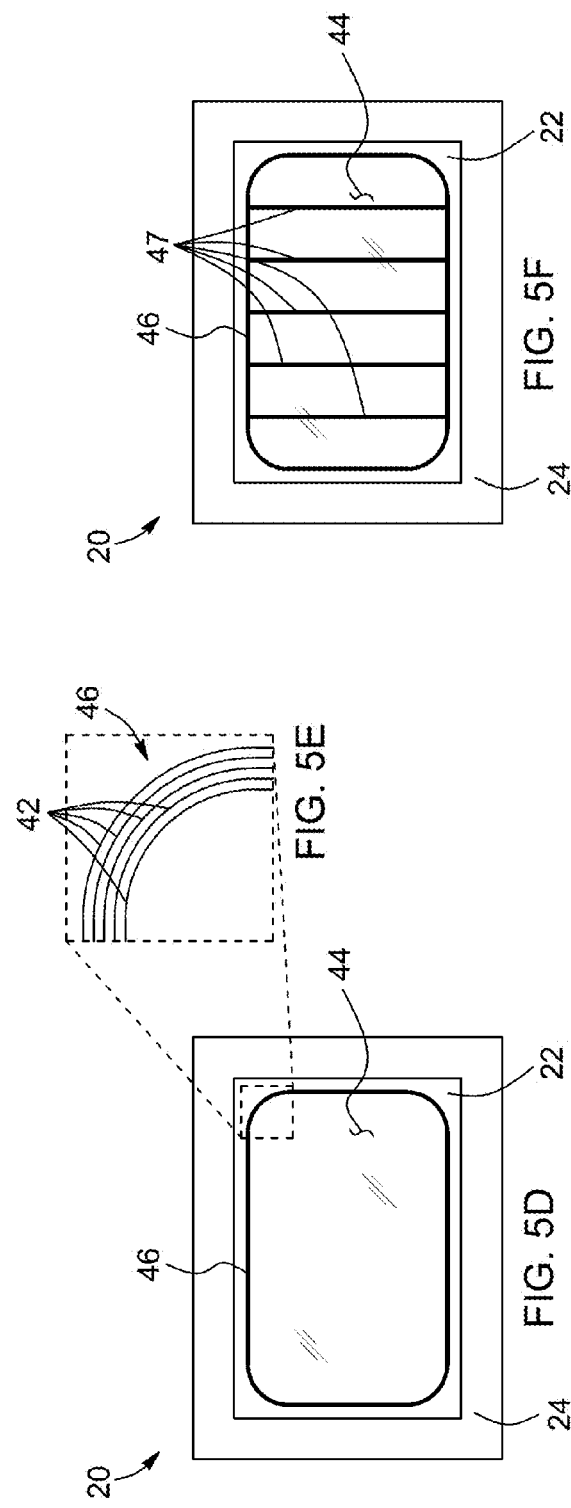

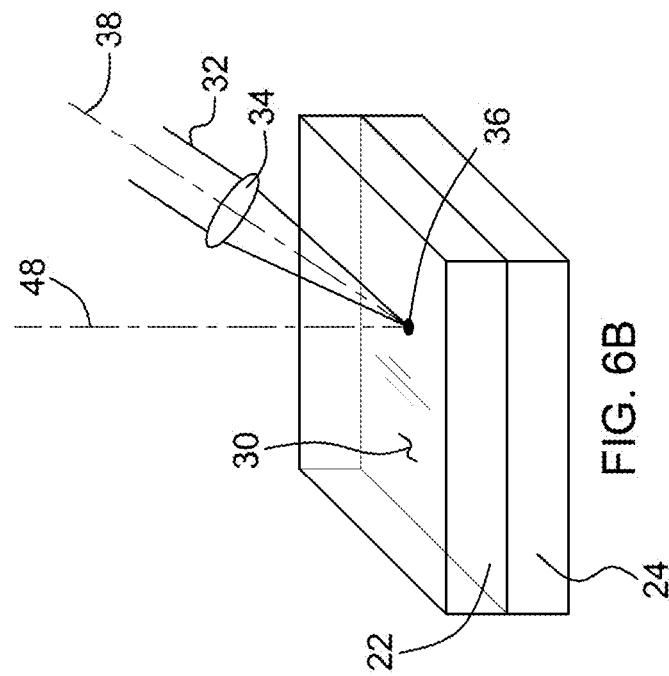
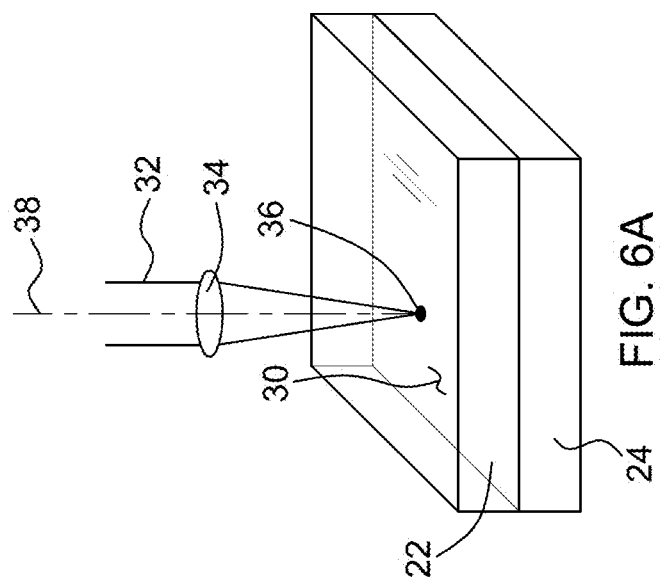

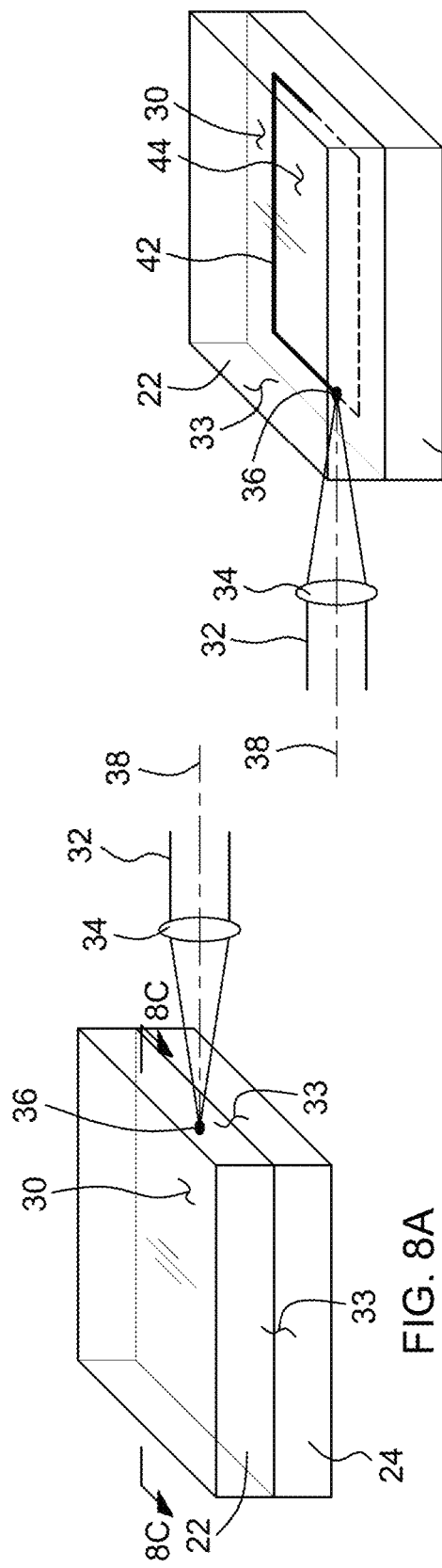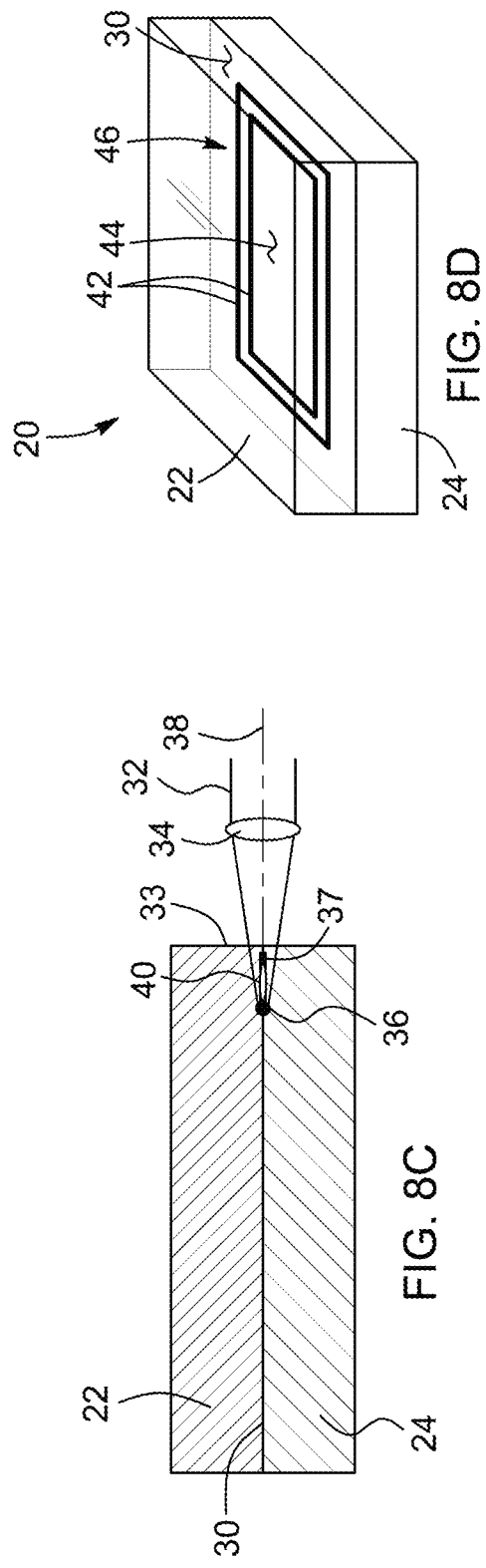

LASER REINFORCED DIRECT BONDING OF OPTICAL COMPONENTS

REFERENCE TO RELATED APPLICATIONS

This application is a National Stage of International Application No. PCT/CA2012/000023, filed on Jan. 10, 2012, which claims the priority of U.S. Provisional Application No. 61/431,177, filed Jan. 10, 2011, the disclosures of which are incorporated by reference in their entireties.

FIELD OF THE INVENTION

The present invention relates to the field of assembling optical components, and more particularly concerns a method for the laser reinforced direct bonding of two optical components and a reinforced optical assembly made thereby

BACKGROUND OF THE INVENTION

The assembling of various materials such as glasses, crystals, metals, semiconductors, polymers and organic polymeric compounds for optical applications requires particular techniques for ensuring that the resulting assembly preserves a high surface quality as well as optimal optical transmission properties. In some cases, the use of a bonding material such as epoxy or other adhesive materials is to be avoided. Traditional techniques of assembling optical materials may induce mechanical stress, thereby deforming the bonded surfaces, or may result in a bonding having insufficient mechanical strength. In addition, the bonded surfaces may present local or extended damages resulting from the bonding techniques themselves. Moreover, due to the presence of visible bonding marks and residual surface deformations, these techniques may also alter the optical properties of the resulting assembly, such as its transparency or its reflectivity. Therefore, new approaches to the assembling of optical materials need to be developed in order to provide bonded structures that retain high optical qualities and remain exempt of alterations and defects induced by the bonding processes.

It is known that two solid materials of virtually any composition may be joined together using the method of direct bonding. Direct bonding relies on molecular bonding forces occurring under specific conditions at the interface between two surfaces. When two polished surfaces are brought close enough to each other, intermolecular van der Waals forces become sufficiently strong to maintain together the surfaces without any other bonding means. Hence, in the case of optical components, the optical quality of such direct bond is extremely high since no deformation, damage or other mechanical stress is induced. Furthermore, the optical properties of the bonded materials are preserved since direct bonding does not require or induce any physical or chemical alteration.

Other techniques have been developed for joining together two surfaces. For example, the use of ultrashort laser pulses to join transparent materials is a known technique. The ultrashort pulse filamentation effect in transparent materials creates a linear plasma column arising from the non-linear optical process of self-focusing. The overall length of this plasma column is proportional to various parameters, including the focal length of the focusing objective and the incident pulse energy. This approach has been proposed by Itoh et al. in U.S. patent application no. 2010/0047587, where it is stated that the generation of relatively long filaments (i.e. filaments longer than 100 micrometers) permits the inscription of laser weld seams between two transparent dielectric materials. One advantage of this procedure is that it is not overly sensitive to the positioning of the axial focal spot of the laser pulses. However, this method requires excessive pulse energy in comparison to what is really needed to induce non-linear absorption. The long filaments thus generated modify matter in a region extending from several tens to hundreds of micrometers inside each material, which is much larger than the thickness of the interface. The strong non-linear absorption may also cause unwanted damage mechanisms. In U.S. patent application no. 2007/0051706, Bovatsek et al. propose the use of an ultrashort pulse train at high repetition rate to bond together two surfaces in a process that deforms these surfaces. In this approach, the surfaces to be bonded are first locally deformed using high-power ultrashort laser pulses so as to locally bring closer (or raise) these surfaces. A second pass of the laser is then used to form the weld between the surfaces. This approach can however degrade the surface quality of the bonded materials.

Furthermore, several traditional methods of laser welding require that the surfaces be maintained together mechanically during the welding process. This may be accomplished, for example, with the use of a clamp or an air jet, which applies a sufficient pressure on the surfaces during exposure to laser pulses. In another similar method, the two materials are brought into contact under relatively high pressure and for a sufficiently long period of time, so as to temporarily bond the surfaces after withdrawal of the clamp or other device, in a process related to cold welding. These methods rely on elastic deformation of the materials, in which important residual stress build-up and surface deformations may reduce the mechanical strength of the resulting bonded structure.

Laser sealing of a direct bond was proposed by Haisman et al. in U.S. Pat. No. 5,009,689 but its applications are limited by the use of a continuous laser beam. Therefore, this process cannot be utilized when the two materials to be joined together are both transparent to the wavelength of the laser (e.g. glasses), irrespectively of whether these two materials are identical or dissimilar. Further, the process proposed by Haisman et al. relies on linear absorption of the laser energy by one of the two materials, thus creating local fusion by purely thermal mechanisms. In order for the process to operate successfully, a bond activating treatment is necessary, thereby adding an additional preparation step for the surfaces to be joined.

It has been proposed by Miyamoto et al. (I. Miyamoto, K. Cvecek, Y. Okamoto and M. Schmidt, "Novel fusion welding technology of glass using ultrashort pulse lasers", *Physics Procedia*, vol. 5, 2010, pp. 483-493) to weld glass plates, pre-assembled by optical bonding, with 10-picosecond laser pulses emitted at high repetition rate. In this laser welding regime, adverse thermal effects can induce localized damages and defects, such as cracks, that affect the optical properties of the assembly. An extensive review of the damages and defects arising in this laser welding technique has been presented by Cvecek et al. (K. Cvecek, I. Alexeev, I. Miyamoto and M. Schmidt, "Defect formation in glass welding by means of ultra short laser pulses", *Physics Procedia*, vol. 5, 2010, pp. 495-502).

Finally, in U.S. patent application no. 2010/0304151, Tuennermann et al. describe a method for laser-assisted bonding of substrates, in which the substrates are connected together firstly frictionally by pressing together and thereby achieving a state of optical contact. Subsequent strengthening of the connection is effected by activation in regions which is induced by an ultrashort pulsed laser. This activation results in the local heating of the exposed region without reaching the melting point of the materials, so that this process of laser-assisted bonding departs from the traditional scope of welding. Moreover, there is no mention of an unaltered optical transmission window or of any other strategy by which the optical properties of the resulting assembly remain unaltered following the process of laser irradiation.

In view of the above considerations, there is therefore a need for a method for joining together optical components that provides high surface and optical qualities while alleviating at least some of the drawbacks of the prior art.

SUMMARY OF THE INVENTION

In accordance with one aspect of the invention, there is provided a method for joining together a first and a second optical component, each of the first and second optical components having a respective bonding surface. The method includes the steps of:
 a) assembling the first and second optical components by direct bonding of the respective bonding surfaces thereof together, thereby defining a direct-bonded interface therebetween;
 b) reinforcing the direct-bonded interface with a weld seam including at least one substantially continuous reinforcing weld line forming a closed shape enclosing a sealed direct-bonded region. The reinforcing includes, for each of the at least one weld line, the steps of:
  1) propagating ultrashort laser pulses along an optical axis through the first optical component toward the direct-bonded interface. The ultrashort laser pulses have a spectral bandwidth within which at least the first optical component is substantially transparent. This step further includes focusing the ultrashort laser pulses on a focal spot inside the second optical component near the direct-bonded interface and controlling a peak power of the ultrashort laser pulses at the direct-bonded interface so as to generate non-linear optical phenomena inducing a localized junction between the first and second optical components; and
  2) translating the focal spot of the ultrashort laser pulses with respect to the direct-bonded interface in a pattern defining the closed shape.

According to another aspect of the invention, there is provided a method for joining together a first and a second optical component, each of the first and second optical components having a respective bonding surface, the respective bonding surfaces having matching boundaries. The method includes the steps of:
 a) aligning the boundaries of the respective bonding surfaces of the first and second optical components and assembling the first and second optical components by direct bonding of the respective bonding surfaces thereof together, thereby defining a direct-bonded interface therebetween;
 b) reinforcing the direct-bonded interface with a weld seam comprising at least one substantially continuous reinforcing weld line forming a closed shape enclosing a sealed direct-bonded region. The reinforcing includes, for each of the at least one weld line, the steps of:
  1) propagating ultrashort laser pulses along an optical axis lying substantially in a plane defined by the direct-bonded interface, the ultrashort laser pulses having a spectral bandwidth within which the first and the second optical components are substantially transparent. This step further includes focusing the ultrashort laser pulses on a focal spot positioned along the direct-bonded interface and controlling a peak power of the ultrashort laser pulses at the direct-bonded interface so as to generate non-linear optical phenomena inducing a localized junction between the first and second optical components; and
  2) translating the focal spot of the ultrashort laser pulses with respect to the direct-bonded interface in a pattern defining the closed shape.

According to a further aspect of the invention, there is provided a reinforced optical assembly, including:
 a first optical component joined together with a second optical component, each of the first and second optical components having a respective bonding surface, the first and second optical components being assembled by direct bonding of the respective bonding surfaces thereof together, thereby defining a direct-bonded interface therebetween; and
 a weld seam reinforcing the direct-bonded interface, the weld seam including at least one substantially continuous reinforcing weld line forming a closed shape enclosing a sealed direct-bonded region, each of the at least one weld line having been obtained by:
  propagating ultrashort laser pulses along an optical axis through the first optical component toward the direct-bonded interface, the ultrashort laser pulses having a spectral bandwidth within which at least the first optical component is substantially transparent, focusing the ultrashort laser pulses on a focal spot inside the second optical component near the direct-bonded interface and controlling a peak power of the ultrashort laser pulses at the direct-bonded interface so as to generate non-linear optical phenomena inducing a localized junction between the first and second optical components; and
  translating the focal spot of the ultrashort laser pulses with respect to the direct-bonded interface in a pattern defining the closed shape.

According to yet another aspect of the invention, there is provided a reinforced optical assembly, including:
 a first optical component joined together with a second optical component, each of the first and second optical components having a respective bonding surface, the respective bonding surfaces having matching and aligned boundaries, the first and second optical components being assembled by direct bonding of the respective bonding surfaces thereof together, thereby defining a direct-bonded interface therebetween; and
 a weld seam reinforcing the direct-bonded interface, the weld seam including at least one substantially continuous reinforcing weld line forming a closed shape enclosing a sealed direct-bonded region, each of the at least one weld line having been obtained by:
  propagating ultrashort laser pulses along an optical axis lying substantially in a plane defined the direct-bonded interface, the ultrashort laser pulses having a spectral bandwidth within which the first and second optical components are substantially transparent, focusing the ultrashort laser pulses on a focal spot positioned along the direct-bonded interface and controlling a peak power of the ultrashort laser pulses at the direct-bonded interface so as to generate non-linear optical phenomena inducing a localized junction between the first and second optical components; and translating the focal spot of the ultrashort laser pulses with respect to the direct-bonded interface in a pattern defining the closed shape.

Advantageously, embodiments of the present invention can provide reinforced assemblies of optical components exhibiting hermetic and mechanically resistant bonds over a large area as well as negligible alteration of their optical transmission properties.

The methods and reinforced optical assemblies according to embodiments of the present invention rely on the use of ultrashort laser pulses to generate non-linear optical phenomena that allow depositing energy in a very precise and local manner at the interface between two direct-bonded optical components, so as to create a structural modification of the materials. This reinforcing of a previously direct-bonded interface by ultrashort laser welding does not require any epoxy glue or other adhesive agent and can bond together virtually any combination of two optical materials, provided that at least one of the materials is substantially transparent to the wavelength of the laser.

The first and second optical components can be made of identical or dissimilar materials. In some embodiments, the following material combinations can for example be bonded: glass-glass, glass-metal and glass-semiconductor.

Preferably, the at least one substantially continuous reinforcing weld line includes a plurality of substantially continuous reinforcing weld lines. Also preferably, the at least one substantially continuous reinforcing weld line is inscribed along an outer edge of the direct-bonded interface, thereby ensuring that the optical transmission properties at the center of the sealed direct-bonded region are not affected.

In some embodiments of the invention, the sealed direct-bonded region is substantially rectangular or square or circular in shape, while in these or other embodiments, the sealed direct-bonded region has rounded corners. Preferably, the weld seam defines a sealed direct-bonded region having a circular or rounded-corner shape.

The embodiments of the present invention could be useful in a wide variety of fields, including aerospace, optical design, high-power lasers, crystal assemblies, protection of semi-conductors, encapsulation of hydrophilic materials, protection of thin film coatings and any other fields requiring adhesive-less technology to join materials.

Other features and advantages of the present invention will be better understood upon reading of preferred embodiments thereof with reference to the appended drawings.

BRIEF DESCRIPTION OF THE DRAWINGS

FIGS. 1A to 1F illustrate schematically the steps of a method for joining together a first and a second optical component according to an embodiment of the invention.

FIGS. 5A to 5F are schematic top views of reinforced optical assemblies according to embodiments of the invention, wherein the sealed direct-bonded region is substantially rectangular (FIG. 5A), square (FIG. 5B) and circular (FIG. 5C) in shape. In FIG. 5D, the sealed direct-bonded region has rounded corners. FIG. 5E is an enlarged view of a section of FIG. 5D, showing a plurality of weld lines. FIG. 5F illustrates a reinforced optical assembly according to an embodiment of the invention, wherein additional reinforcing weld lines have been inscribed inside the sealed direct-bonded region.

FIGS. 6A and 6B are perspective views in transparency of the reinforcing of the direct bonding of optical components according to embodiments of the invention, wherein the optical axis of the ultrashort laser pulses is substantially perpendicular to the direct-bonded interface (FIG. 6A) and tilted with respect to a normal to a plane defined by the direct-bonded interface (FIG. 6B), respectively.

FIGS. 8A, 8B and 8D are perspective views in transparency of the reinforcing of the direct bonding of optical components according to embodiments of the invention, wherein the ultrashort laser pulses propagate along an optical axis lying substantially in a plane defined by the direct-bonded interface; FIG. 8C is a side cross-sectional view of the assembly of FIG. 8A.

DESCRIPTION OF PREFERRED EMBODIMENTS OF THE INVENTION

Figure 2A:
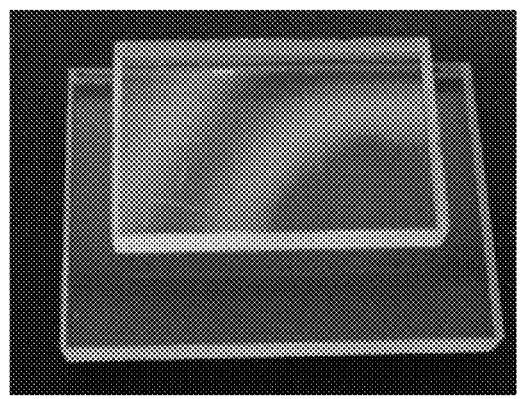
FIG. 2A illustrates the pattern of interference fringes arising due to the presence of a microscopic air gap between two fused silica windows.

In accordance with one aspect of the invention, there is provided a method for joining together a first and a second optical component, each of the first and second optical components having a respective bonding surface.

It will be understood by those skilled in the art that the optical components that can be joined together by the method according to this aspect of the invention may be made up of any solid, non-plastically deformed material, provided that at least the first optical component is substantially transparent to the wavelength of the laser. As long as this requirement is fulfilled, each of the first and second optical components may thus be made up of single elements (e.g. Si, Ag, Al), compounds or organic compounds. Typical non-limiting examples of such compounds are glasses, crystals, metals, semiconductors, polymers and organic polymeric compounds such as polycarbonate, polytetrafluoroethylene (known under the trademark Teflon), and the like. It is an advantage of the present invention that the first and second optical components being joined together by the method of embodiments of the invention can but need not be of a same type. For example, in some embodiments, the first and second optical components consist of fused silica and silicon, respectively.

It will be further understood that the first and second optical components can have various physical parameters such as their shape, size, bonding surface area and thickness, and that these physical parameters can but need not be the same for both components.

Referring now to FIGS. 1A to 1F, there are shown the steps of the method for forming a reinforced optical assembly 20 by joining together a first optical component 22 and a second optical component 24. Broadly described, the method includes a first step of assembling the first and second optical components 22 and 24 by direct bonding of the respective bonding surfaces 26 and 28 thereof together (FIGS. 1A and 1B), followed by a second step of reinforcing the direct bond by using ultrashort pulsed laser welding (FIGS. 1C to 1F). Each of these two steps will now be successively described in greater detail below.

Direct Bonding

The method according to a first aspect of the invention first involves a step of assembling the first and second optical components by direct bonding of their respective bonding surfaces together, thereby defining a direct-bonded interface therebetween.

The expression "direct bonding" is understood herein to refer to a joining method relying on optical contact between bonding surfaces having suitable characteristics, preferably defect-free and highly polished surfaces, which is established without the use of an intermediate to act as a sealant. As one skilled in the art will readily understand, "optical contact" is achieved when the air gap between the two bonding surfaces is eliminated, thereby preventing reflections or interferences which otherwise would alter the optical transmission properties of the structure resulting from the joining of the two optical components. Direct bonding results from the extension of the optical contact to the whole area of the two bonding surfaces. Further, as explained in more details in the next paragraph, direct bonding results from attractive intermolecular electrostatic interactions, the magnitude of which being inversely proportional to the square of the distance between interacting charges. As a result, direct bonding remains insensitive to the nature or to the crystallographic structure of the joined materials. Hence, as a person skilled in the art would readily understand, virtually all solid, non-plastically deformed materials can be direct-bonded, the process being limited solely by the ability to achieve a proper mechanical and chemical surface quality, which may not be possible for some types of materials.

When the separation between particles (e.g. atoms or molecules) becomes of the order of a few atomic distances, the influence of weak electrostatic forces, commonly referred to as van der Waals forces, begins to manifest itself. These forces can be either attractive or repulsive depending on the relative dipole orientation of each particle with respect to that of its neighbors. In general, the movement of electrons around the nucleus produces electronic charge density fluctuations inside atoms or molecules. Hence, at any given instant, this random motion will cause the distribution of electrons in a given particle to become slightly asymmetrical with respect to the nucleus, the resulting electronic imbalance creating an instantaneous dipole in the particle. The positive end of this dipole can then itself attract the electron cloud of a neighboring particle and induce a dipole therein, thereby establishing an attractive force known as dispersion force or London force. For materials in which instantaneous time-varying dipoles can be induced in their atoms or molecules, this induced dipole-dipole London interaction is the dominant van der Waals process. Other van der Waals interactions can take place when particles possess permanent dipoles and are referred to as Debye force and Keesom force.

Because the London force depends only on the mutual distance and relative orientation of the instantaneous dipoles induced in neighboring atoms or molecules, it remains insensitive to their nature and can thus be generated between any given pair of atoms or molecules. Compared to other atomic interactions in matter, though, the London force remains weak and can be easily annihilated by molecular movement or by the impact of other stronger bonding intermolecular forces. However, while the strong covalent and ionic bonds typically arising in amorphous and crystalline solids will easily overtake any weak van der Waals bond formed between molecules, they will not halt their establishment.

When two solid optical components having optically smooth and clean respective bonding surfaces are brought in very close contact, weak van der Waals attractive forces will be established between the first few atomic layers of each bonding surface. At the same time, these layers are held to the remainder of their corresponding bulk material by stronger intermolecular forces. As mentioned above, because van der Waals forces are proportional to $1/d^2$, where d is the distance between two interacting particles, their magnitude increases as the gap between the surfaces to be bonded decreases and becomes significant when that gap is reduced to 10 nanometers at most. When this condition is realized on the major part of the contacted area, optical contact is established and the two bonding surfaces are said to be direct-bonded (provided that they are not plastically deformed). The sum of the van der Waals forces over this whole direct-bonded interface results in a relatively strong bond, whose strength can reach several megapascals in magnitude.

FIG. 1A illustrates a first optical component 22 and a second optical component 24 to be assembled by direct bonding of the respective bonding surfaces 26 and 28 thereof together. As one skilled in the art will readily understand, several factors should be taken into account for the direct bonding of the bonding surfaces 26 and 28 to be successful and/or optimal.

Firstly, the mechanical state of the bonding surfaces 26 and 28 should be excellent. The surface finish should exhibit a flatness of at most the value of half of a wavelength per inch ($\lambda/2$ per inch). When the surface flatness is of a better quality, typically from $\lambda/20$ per inch to $\lambda/4$ per inch, direct bonding is easier to achieve. In addition, the root mean square (RMS) surface roughness of the bonding surfaces 26 and 28 shown in FIG. 1A should be very good, preferably in the range between 1 and 10 angstroms. As one skilled in the art will readily understand, a polishing strategy properly suited to the particular materials employed for the optical components 22 and 24 can be adopted to obtain sufficiently low values for the surface flatness and roughness of the bonding surfaces 26 and 28.

Secondly, the bonding surfaces 26 and 28 are preferably cleaned thoroughly prior to direct bonding thereof, so as to eliminate all physical and chemical contaminants, as well as be exempt from defects such scratches, cracks, and the like. To this end, cleaning techniques well known in the art can be employed such as, for example, ultrasonic wave cleaning of the bonding surfaces 26 and 28 for chemical cleanliness followed by removal of any leftover dust and solvent particles using either air jet dusting, evaporation or simple tissue wiping of the bonding surfaces 26 and 28, or a combination of these techniques.

Referring now to FIG. 1B, once the bounding surfaces 26 and 28 have been adequately polished and cleaned, they are stacked together, preferably at ambient temperature and pressure, so as to assemble the first and second optical components 22 and 24 by direct bonding of the respective bonding surfaces 26 and 28 thereof together, thereby defining a direct-bonded interface 30 therebetween.

Achieving optical contact requires the contacting of the bonding surfaces 26 and 28 shown in FIG. 1B to yield a bond exempt of air pockets and contaminants. In practice, however, it is typical for a pattern of interference fringes to appear, as shown in FIG. 2A for an assembly of two fused silica windows. As one skilled in the art will readily understand, interference fringes and related surface reflections indicate that a microscopic air gap remains between the two bonding surfaces 26 and 28. At the right side of the interference pattern, the presence of a dark fringe confirms that the optical contact is optimal in this region. The two bonding surfaces 26 and 28 are said to be direct-bonded when the dark fringe extends and establishes optical contact across the whole contacted area, thereby eliminating interference fringes, surface reflections and mechanical constraints from the resulting direct-bonded interface 30. Such a state of direct bonding is illustrated in FIG. 2B for two direct-bonded fused silica windows.

Figure 2B:
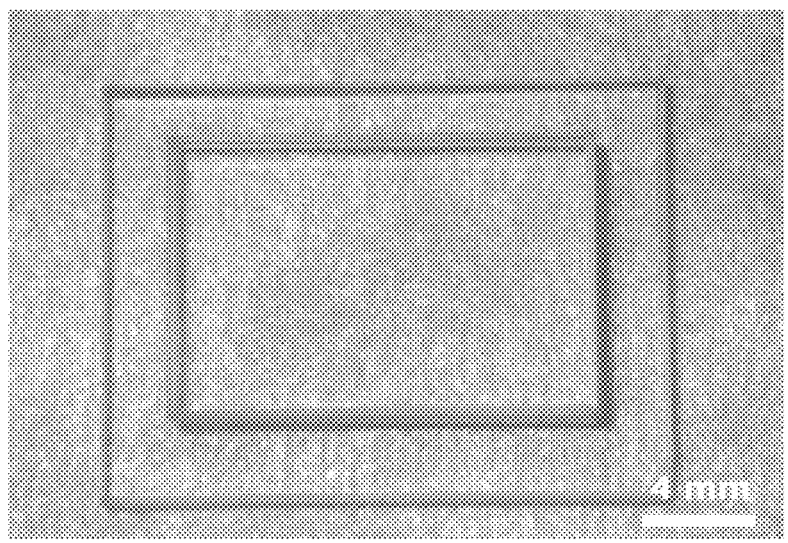
FIG. 2B shows a picture of two direct-bonded fused silica windows, between which the absence of an air gap eliminates the pattern of interference fringes.
Figure 2C:
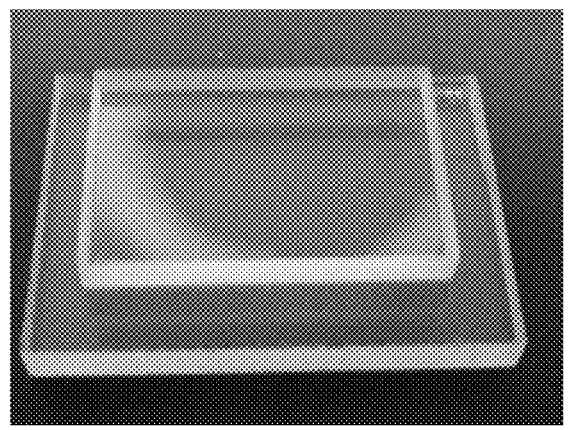
FIG. 2C shows a picture of the insertion of air gaps at the corners of two optically-contacted fused silica windows.

Direct bonds, such as that illustrated schematically in FIG. 1B and experimentally in FIG. 2B, are mechanically strong, but do not resist well to short and long standing elastic or plastic deformations of the materials making up the first and second optical components 22 and 24. Such deformations can take place following application of large thermal and mechanical loads to the reinforced optical assembly 20, for example a temperature gradient, a thermal shock, pressure variations, strong tensile or shear mechanical stresses, or a combination thereof. As a result, a lift-off associated with a gap between the two bonding surfaces 26 and 28 typically appears at the edge of the direct-bonded interface 30. Hence, with increasing environmental constraints, the gap fills itself with ambient air, as illustrated in FIG. 2C, and gradually spreads to the inner part of the direct-bonded interface 30, so as to progressively separate the first and second optical components 22 and 24.

In order to minimize the risk of separation of a direct-bonded assembly, the weak electrostatic bonds between the respective atoms and molecules of the two optical components may be transformed into strong covalent bonds. As is well known by those skilled in the art, this can be commonly achieved through thermal annealing, wherein the direct bond resulting from van der Waals forces is transformed to a covalent bond, thereby creating "bulk-like" conditions at the direct-bonded interface. Reinforcement of a direct bond by thermal annealing is, however, a very slow process, so that several days of high-temperature annealing may be required to transform all weak electrostatic bonds into covalent bonds. Furthermore, the combinations of materials to which thermal annealing can be applied are restricted by the thermal nature of the process, so that only materials having very similar thermal properties (e.g. thermal expansion coefficients) can be thermally annealed. Taking these limitations into consideration, the reinforcement of a direct bond would clearly benefit from a faster and/or more versatile reinforcing procedure for which the two direct-bonded optical components need not be heated.

Reinforcement by Ultrashort Pulsed Laser Welding

The method according to an aspect of the present invention further includes a step of reinforcement of the direct-bonded interface with a weld seam including at least one substantially continuous reinforcing weld line forming a closed shape enclosing a sealed direct-bonded region.

The reinforcing procedure according to one embodiment of the invention is illustrated schematically in FIGS. 1C to 1F. In general terms, the reinforcing procedure relies on a cautious exposure of the direct-bonded interface 30 to ultrashort laser pulses 32 (FIG. 1C). A focusing element 34 is preferably used to focus the ultrashort laser pulses to a focal spot 36 positioned slightly inside the second optical component 24 (FIG. 1D). The peak power of the laser pulses 32 is controlled so as to generate the non-linear optical phenomena known as self-focusing, which will create a plasma channel, resulting from the formation of optical filaments 37, crossing the direct-bonded interface 30 and inducing a localized junction 40 between the first and second optical components 22 and 24 (see also FIGS. 4A to 4C). During laser exposure, the focal spot 36 of the laser pulses 32 is translated with respect to the direct-bonded interface in order to write at least one substantially continuous reinforcing weld line 42 along a closed pattern defining the sealed direct-bonded region 44 (FIG. 1E). The at least one weld line 42 defines a weld seam 46 reinforcing the direct-bonded interface 30, thereby resulting in a reinforced optical assembly 20 (FIG. 1F). The step of reinforcing the direct-bonded interface 30 according to one embodiment will be described in greater detail below.

Referring to FIG. 1C, the reinforcement first includes, for each of the at least one weld line 42, propagating ultrashort laser pulses 32 along an optical axis 38 through the first optical component 22 toward the direct-bonded interface 30, the laser pulses 32 having a spectral bandwidth within which at least the first optical component 22 is substantially transparent. It should be noted that no such restriction exists regarding the transparency of the second optical component 24, which can be either substantially transparent or opaque (or anywhere in between) to the wavelength of the laser pulses 32.

In the present description, the expression "ultrashort laser pulses" is understood to designate laser pulses having a duration of about 500 femtoseconds or less and a sufficiently high pulse energy, thereby carrying a sufficiently high peak power to induce self-focusing near the direct-bonded interface 30. The ultrashort laser pulses 32 are generated by a laser source 31, which can be embodied, for example, by a solid-state laser, a fiber laser, a solid state amplification system, an optical parametric amplification system, a fiber amplification system, a chirped pulse amplification system or a combination of these lasers and amplification systems.

Likewise, the expression "substantially transparent" is understood herein to refer to an optical component that, in the absence of non-linear absorption, plasma formation or any other non-linear optical processes, does not absorb a significant proportion of the incident laser energy throughout its whole thickness, for example not more than a few percent. Hence, in the context of the present invention, the first optical component 22 should have a degree of transparency that is sufficient to allow enough of the energy from the laser pulses 32 to reach the direct-bonded interface 30 and provide the desired non-linear effects, as explained further below. On the contrary, the term "opaque" is understood herein to refer to an optical component that absorbs a significant proportion of the incident laser energy throughout its whole thickness. Hence, the spectral bandwidth of the ultrashort laser pulses 32 should be adjusted in order to fulfill the necessary condition that first optical component 22 is substantially transparent to the laser pulses 32.

In embodiments of the invention, the spectral bandwidth of the ultrashort laser pulses is contained in a range extending from the ultraviolet part of the electromagnetic spectrum to the far infrared part of the electromagnetic spectrum. This spectral range includes wavelength values between 1 nanometer and 50 micrometers. Laser systems capable of delivering ultrashort laser pulses typically emit pulses with a spectral bandwidth contained in the range specified.

As one skilled in the art will readily understand, an optical parametric amplifier or another appropriate device may be used to modify the spectral bandwidth of the ultrashort pulses so that it falls within the transparency range of a given material. For example, ultrashort pulses having a central wavelength of 800 nanometers may be propagated through an optical parametric amplifier so as to exit the amplifier with a central wavelength of 2000 nanometers, thereby accessing the transparency range of silicon.

Figures 4A, 4B, 4C:
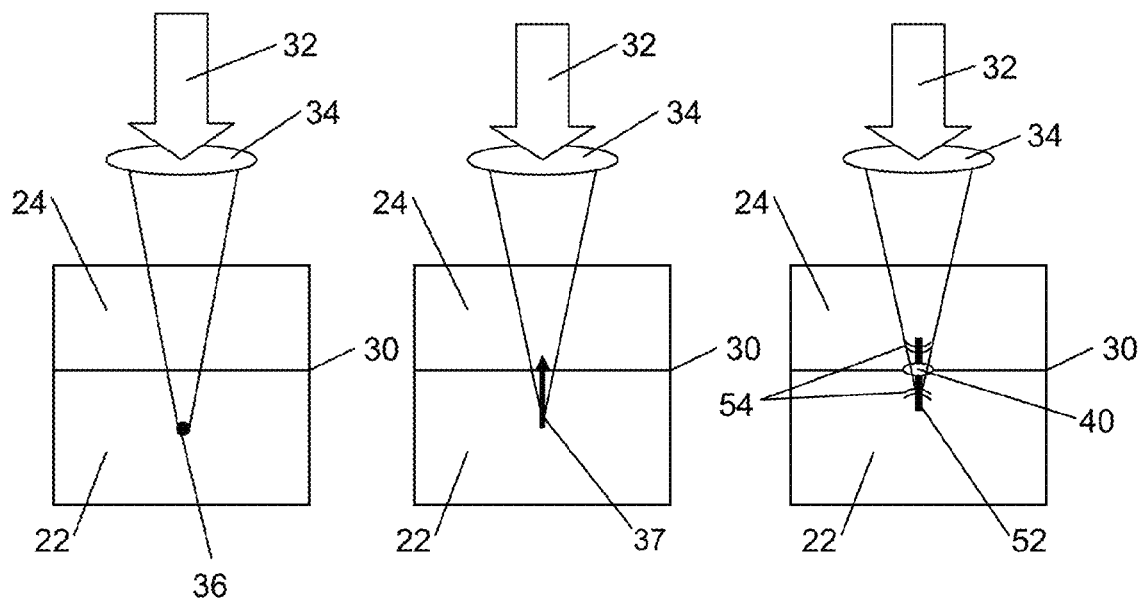
FIGS. 4A to 4C illustrates schematically the chronology of the physical processes following the focusing of ultrashort laser pulses near the direct-bonded interface between a first and a second optical component, wherein both optical components are substantially transparent to the wavelength of the laser pulses.

Referring now more specifically to FIGS. 1C and 1D, the reinforcement step also includes focusing the ultrashort laser pulses 32 on a focal spot 36 inside the second optical component 24 near the direct-bonded interface 30. Preferably, the ultrashort laser pulses 32 are focused through the substantially transparent first optical component 22 by a focusing element 34 disposed in the path of the laser pulses 32, so as to position the focal spot 36 of the focusing element 34 slightly inside the second optical component 24, as shown in FIGS. 1D and 4A. For example, in a preferred embodiment of the invention, the focal spot 36 is located at a position inside the second optical component 24 between about 10 and 20 micrometers beyond the direct-bonded interface 30. One skilled in the art will readily understand that the expression "near the direct-bonded interface" refers to any distance which will result in an optical filament 37 formed from non-linear optical phenomena to cross the direct-bonded interface 30 and therefore enable the desired reinforcement thereof, as will be explained in more detail below.

The focusing element 34 may be embodied, for example, by a spherical lens, an aspherical lens, a microscope objective lens, a cylindrical lens or any other appropriate lens assembly or combination thereof. Additionally, as will be readily understood by one skilled in the art, prior to being focused by the focusing element 34, the ultrashort laser pulses 32 may go through any appropriate component for directing, amplifying, polarizing, attenuating, or otherwise acting on the laser beam formed by the ultrashort pulses 32, as may be required by the particularities of a given embodiment of the invention. For example, FIG. 15 shows an example of an experimental setup which can be used to realize the present method, in which the ultrashort pulses 32 emitted by the laser source 31 pass through a wave plate 56 and a polarizer 58 for power and polarization control, respectively. Moreover, the optical assembly 20 may be installed on a mount 60, which can be precisely aligned with the optical axis of the pulses 32 using multiple axis translation stages 62 and goniometers 64.

Referring now to FIGS. 1D and 4A to 4C, the reinforcing of the direct-bonded interface 30 further includes controlling a peak power of the laser pulses 32 at the direct-bonded interface 30 so as to generate non-linear optical phenomena inducing a localized junction 40 between the first and second optical components 22 and 24.

In the present description, the expression "non-linear optical phenomena" generally refers to phenomena resulting from an interaction between light and a material characterized by a non-linear relationship between the induced electric polarization of the material and the electric field of light. As is well known by one skilled in the art, non-linear optical phenomena can be observed by propagating light pulses of sufficiently high intensity in matter, typically by using ultrashort pulsed lasers along with proper focusing optics.

In the present description, the term "peak power" refers to a property of the laser pulses which is equal to the pulse energy divided by the pulse duration at the full width at half maximum (FWHM). It is expressed in units of joules per second (J/s) or watts (W). Further, the term "peak intensity" refers herein to another property of the laser pulses governed by the peak power of the pulses which is averaged over the beam size in the plane perpendicular to the optical axis, wherein the beam size is controlled by the self-focusing effect described below as well as by the focal length of the focusing element. Hence, the peak intensity is obtained by dividing the peak power by the beam size at $1/e^2$ of its axial value and is expressed in units of watts per square meter ($W/m^2$).

In the context of the present invention, the focal spot 36 of the focusing element 34 is firstly positioned slightly inside the second optical component 24, as shown in FIG. 4A. In these circumstances, when an ultrashort pulse 32 having a peak power value higher than some threshold defined below is incident upon the first optical component 22, different temporal slices of the ultrashort pulse 32 will be focused at different positions before that of the focal spot 36 throughout the pulse's growth in intensity. The focus positions of the slices will eventually cross back through the direct-bonded interface 30 and ultimately enter the first optical component 22. The pulse 32 will generally evolve to create optical filaments 37 having finite length and extending on both sides of the direct-bonded interface 30 (FIG. 4B).

This process is a consequence of the well-known self-focusing phenomenon caused by the optical Kerr effect. As is also well known by those skilled in the art, the optical Kerr effect is a non-linear optical phenomenon by which the non-linear refractive index of a material depends on the intensity of the light propagating in that material. Self-focusing is generated when the peak power of the laser pulses 32 becomes larger than a critical power $P_c$ for self-focusing, which is can be expressed as:

$$P_c \approx \frac{\lambda^2}{2\pi n_0 n_2}, \quad (1)$$

where $\lambda$ is the laser wavelength in vacuum and $n_0$ and $n_2$ are the linear and non-linear refractive indices, respectively.

As self-focusing develops, the peak intensity of the pulse increases along the direction of propagation thereof and eventually becomes sufficient to trigger non-linear ionization of the irradiated material through non-linear absorption of the laser energy. A plasma is thus generated and will exert a defocusing effect acting against self-focusing and preventing its further development. This balance between the self-focusing effect resulting from the optical Kerr effect and the counteracting plasma defocusing effect will clamp the peak intensity of the beam (intensity clamping). This phenomena leads to the observation of a line of focusing (FIG. 4B), commonly referred to as an optical filament 37, along which the laser intensity is auto-regulated by intensity clamping.

In preferred embodiments of the present invention, once the geometrical focus of the focusing element 34 is positioned slightly inside the second optical component 24, the peak power of the pulses 32 is controlled so as to position the beginning of the filaments 37 and of non-linear absorption on the optical axis 38 inside the first optical component 22. The evolution of non-linear absorption along the optical axis 38 generates a local plasma channel 52 inside the optical filaments 37. This plasma channel crosses the direct-bonded interface 30, therefore setting proper conditions for laser welding, as shown in FIGS. 4B and 4C.

In order to achieve self-focusing inside the first optical component 22, the peak power of the pulses 32 should be at least of the order of megawatts, that is, generally larger than the critical power $P_c$ for self-focusing of the first optical component 22 given by equation (1), which is readily accessible using ultrashort laser pulses 32 having a duration in the femtosecond range. It should be emphasized that neither the type nor the spectrum bandwidth of the laser source 31 has a strong impact on the result, inasmuch as the first optical component 22 is substantially transparent to the laser at the wavelength of operation according to the definition of the term "substantially transparent" given above. As those skilled in the art will readily understand, preferred embodiments of the present invention should require that the beam be of a fairly good quality, typically Gaussian, and emitted in a pulsed manner with minimal variations in pulse-to-pulse optical characteristics. Furthermore, the focal length of the focusing element 34 should be chosen so as to induce optical filaments 37 of sufficient length to cross the direct-bonded interface 30 when the focal spot 36 is positioned inside the second optical component 24. For typical embodiments, the focal length of the focusing element 34 is in the range between 1 and 200 millimeters.

In addition, the peak laser intensity achieved by intensity clamping for the method according to the present invention of reinforcing a direct bond between two optical components 22 and 24 depends also on the non-linear properties of the substantially transparent materials used for the first optical component 22 and, for some preferred embodiments, the second optical component 24. Preferably, the peak power of the laser pulses 32 should be adjusted so that the optical Kerr effect is sufficiently strong to induce self-focusing of the laser pulses 32 inside the first optical component 22, as in the embodiment shown in FIG. 4B.

Referring now to FIG. 4C, the relaxation of the plasma inside the optical filaments 37 creates a shock wave 54, which propels molten matter originally contained in plasma from the first optical component 22 into the second optical component 24. A similar interaction may also take place inside the second optical component 24 if it is substantially transparent to the spectral bandwidth of the laser. This region of mixing of molten material at the direct-bonded interface 30 may be referred to as a localized junction 40. The very short thermal cooling period (typically of the order of microseconds) associated with this phenomena may be lengthened by the moderate heat accumulation induced by successive ultrashort pulses 32 emitted at a sufficient repetition rate, for example beyond 300 kHz for fused silica glass. This increase of the thermal cooling period by proper adjustment of the repetition rate of the ultrashort laser pulses 32 creates conditions similar to thermal annealing, but in a much more localized manner inside the localized junction 40, thus favoring the creation and transformation of atomic bonds between the materials making up the first and second optical components 22 and 24.

In embodiments of the invention wherein the second optical component 24 is opaque to the wavelength of the laser, linear absorption of the laser energy takes place at its bonding surface 28 and through a small fraction of its thickness. The opaque area exposed to laser irradiation is lightly melted without preventing the generation of self-focusing and the creation of a localized junction 40 (see FIG. 1D), in accordance with the method of the present invention. For these embodiments of the invention, self-focusing is effective inside the first substantially transparent optical component 22, provided the peak power of the laser pulses 32 is sufficiently high and does not depend on the laser energy absorbed by the second optical component 24. As a plasma channel 52 is generated inside the first optical component 22, a microscopic volume of matter is propelled toward the second optical component 24, as explained above. Since the material making up the second optical component 24 is preheated by the initial linear absorption of the laser energy, fusion and thermal dilatation contribute to mix materials between the first and second optical components 22 and 24 and to support the formation of atomic bonds. Furthermore, since the induced mechanical stress is limited due to the very short cooling period, a large weld seam an be inscribed between dissimilar materials, as is demonstrated in FIGS. 3, 7A and 7B.

In a preferred embodiment of the invention, the peak power of the laser pulses 32 adjusted so as to be slightly higher than the self-focusing threshold at the direct-bonded interface 30 separating the first and second optical components 22 and 24. The materials composing the first and second optical components 22 and 24 are thus modified only on a very small fraction of their respective thickness, thereby permitting to achieve ideal bonding and welding conditions as well as minimal residual stress build-up around the localized junction 40 shown in FIG. 10. Hence, the method according to the present invention allows controlling the pulse peak power so as to generate, through self-focusing, optical filaments 37 having a length typically ranging between 40 to 80 micrometers, therefore limiting the damage and excessive exposure inside each of the first and second optical components 22 and 24.

As mentioned above, non-linear ionization processes are responsible for the absorption of a sufficient amount of laser energy to modify matter in a very localized and smooth manner, thereby allowing reinforcement of the direct bond between the first and second optical components. Depending on the peak intensity reached within the optical filaments, the dominant mechanism governing the ionization of the materials making up the two optical components can either be multi-photon absorption, a tunnelling effect or a combination thereof.

The multi-photon ionization mechanism consists in the absorption of several low energy photons (typically in the infrared part of the electromagnetic spectrum) by an electron, thus enabling the electron to cross the band gap energy of the material and reach the conduction band. The minimal number of photons which must be absorbed is defined as the smallest integer k verifying the following condition:

$$khv \geq E_g \quad (2)$$

where $v$ is the photon frequency, h is the Plank constant and $E_g$ is the material band gap energy. Equation (2) indicates that the sum of the individual photon energies must be at least equal to the band gap energy. This process is typically dominant for pulse peak intensities below $10^{13}$ W/cm$^2$.

When the peak intensity reaches higher values, the intense electric field of the ultrashort pulses distorts the electron's potential barrier and reduces the Coulomb potential linking the electron to the atom. The strong electric field also increases the kinetic energy of the electron, so that there is a significant probability that the bound electron can tunnel through the barrier and reach the conduction band. This tunnelling effect is typically dominant for peak intensities between $10^{14}$-$10^{16}$ W/cm$^2$.

For intermediate peak intensities in the range between $10^{13}$ and $10^{14}$ W/cm$^2$, which is typically the case of the self-focusing of ultrashort pulses in glass, both multi-photon absorption and tunnelling effect processes compete to free the bound electrons from the valence band. The absorption of one or several incident photons by the electrons will help them gain enough kinetic energy to overcome the distorted potential barrier. By these processes and very shortly after the passage of the ultrashort laser pulses 32 through the medium, an electron-hole plasma channel 52 is locally formed close to the direct-bonded interface 30, as shown in FIG. 4C. Relaxation of the excited electron-hole plasma channel 52 in the bulk material leaves behind a small region characterized by a smooth refractive index change and small residual birefringence. As discussed previously, the relaxation of such plasma close to the direct-bonded interface 30 between two direct-bonded optical components 22 and 24 results in the formation of a reinforced localized junction 40.

Figure 3:
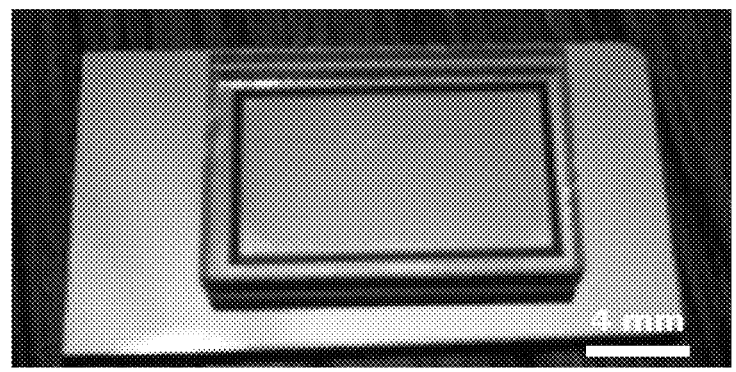
FIG. 3 is a photograph of a reinforced optical assembly according to an embodiment of the present invention, wherein a direct bond between fused silica and silicon was reinforced following laser exposure so as to inscribe a rectangular shaped weld seam.

The reinforcing process described so far concerns the inscription of a single localized junction 40 at the direct-bonded interface 30 between two optical components 22 and 24, the position of the localized junction 40 being determined by the position of the focal spot 36 of the pulses 32 in the plane defined by the direct-bonded interface 30 (see FIGS. 1C and 1D). In order to inscribe a weld seam 46 including at least one substantially continuous reinforcing weld line 42 forming a dose shape enclosing a sealed direct-bonded region 44, the reinforcing process according to embodiments of the present invention requires translating the focal spot 36 of the laser pulses 32 with respect to the direct-bonded interface 30 in a pattern defining the closed shape, as shown in FIGS. 1E and 1F. For illustrative purposes, FIG. 3 shows a preferred embodiment of the present invention in which a direct bond between fused silica and silicon was reinforced following exposure to ultrashort pulses.

In the present description, the expression "weld line" refers to a series of preferably seemingly contiguous yet punctual localized junctions, which is obtained by translating the focal spot of the laser pulses with respect to the direct-bonded interface according to a pattern enclosing a sealed direct-bonded region. A weld line is understood herein to be the result of one pass of the laser along the path defining the sealed direct-bonded region. For example, the preferred embodiment of FIG. 1E illustrates schematically the ongoing process of inscribing a first substantially continuous reinforcing weld line 42 along a path enclosing and defining a sealed direct-bonded region 44. Likewise, the expression "weld seam" is understood herein to refer to the resulting set of at least one substantially continuous reinforcing weld line. As an example, the embodiment of FIG. 1F shows a schematic representation of a reinforced optical assembly 20 reinforced by a weld seam 46 comprising two weld lines 42 enclosing a sealed direct-bonded region 44.

It should be emphasized here that since the ultrashort pulsed laser reinforcing method according to the present invention is accompanied by no significant displacement of matter around the localized junction by thermal dilation, the expressions "weld line" and "weld seam" as employed herein should not be construed in view of the traditional meaning of "welding" as involving a fusion and thermal dilatation of the "welded" materials.

Furthermore, the expression "sealed direct-bonded region" is understood herein to designate a region that has been "sealed" by the method of ultrashort pulsed laser welding of the present invention so as to become substantially impervious to the migration of air gaps or other bonding alterations from the outside to the inside thereof.

Referring to the embodiments of FIGS. 5A to 5E, the sealed direct-bonded region 44 enclosed by a weld seam 46 can be substantially rectangular (FIG. 5A), square (FIG. 5B) or circular (FIG. 5C) in shape, or may possess rounded corners (FIGS. 5D and 5E). Preferably, as exemplified by the embodiments of FIGS. 5A, 5D and 5E, the weld seam 46 defines a sealed direct-bonded region 44 having a circular or rounded-corner shape, which allows inscribing each of the at least one weld line 42 comprising the weld seam 46 with less starting and stopping points, thereby limiting build-up of constraints and crack initiation from corners.

In some embodiments, the at least one substantially continuous reinforcing weld line 42 preferably includes a plurality of substantially continuous reinforcing weld lines 42, as illustrated in FIG. 5E, since the multiplication of weld lines 42 upon a direct-bonded interface 30 reinforces the mechanical strength of the optical assembly 20. Also preferably, the at least one substantially continuous reinforcing weld line 42 may be inscribed along an outer edge of the direct-bonded interface 30, as for the embodiments shown in FIGS. 5A, 5C and 5D. Advantageously, the inscription of weld lines 42 along the outer edge of the direct-bonded interface 30 will maximize the size of the sealed direct-bonded region 44 wherein the optical transmission properties of the reinforced optical assembly 20 are not affected by the material's density change occurring in the vicinity of the weld seam 46. However, depending on the intended use of the resulting reinforced optical assembly 20 the sealed direct-bonded region 44 may cover only a portion of the joined optical components 22 and 24 without departing from the scope of the present invention.

Optionally, some embodiments of the invention may include at least one additional reinforcing weld line 47 inscribed inside the sealed direct-bonded region 44, thereby reinforcing the central part thereof. In particular, the direct-bonded interface 30 may be reinforced by multiplying weld lines 47 inside the sealed direct-bonded region 44, for example by inscribing successive parallel and equally spaced weld lines 47 along one direction in the plane of the direct-bonded interface 30, as shown in FIG. 5F. It is to be noted, however, that inscribing such additional weld lines 47 inside the sealed direct-bonded region 44 may not be appropriate in embodiments wherein the optical transmission properties of the reinforced optical assembly 20 should remain unaffected by the ultrashort pulsed laser welding.

In some embodiments of the invention, the spacing between successive weld lines may be at least equal to the maximum width of a modified region induced by a weld line in either the first or second optical component, thereby avoiding unnecessary overlapping of weld lines and important damage to the two optical components. For these embodiments, the reinforcement factor will thus be optimal.

In some embodiments of the invention, the step of translating the focal spot of the impinging pulses is performed by moving the direct-bonded interface to be reinforced with respect to the optical axis of the laser pulses, preferably by mounting the direct-bonded optical components on a motorized linear translation device. In the setup shown in FIG. 15, the direct-bonded interface may be moved by using multiple axis translation stages 62 activated with a multiple axis controller. Also preferably, the controller may be connected to a computer in which a built-in or custom user interface allows programming the movement of the stages to follow predetermined paths (e.g. rectangular or circular patterns) corresponding to the shape of the sealed direct-bonded region to be inscribed by the laser pulses. Alternatively, in other embodiments, the step of translating the focal spot includes moving the optical axis of the laser pulses with respect to the direct-bonded interface, for example using a similar apparatus or a galvanometer controlling one or more optical elements in the path of the laser pulses.

In some embodiments, the method according to an aspect of the present invention gives the freedom to inscribe weld lines with controllable length, spacing, direction and curvature. As one skilled in the art will readily understand, the scan speed at which the focal spot of the pulses is translated with respect the direct-bonded interface to be reinforced should be adjusted in accordance with the repetition rate of the pulses. In preferred embodiments, the scan speed is slow enough to allow sufficient spatial overlapping of the consecutive focused pulses, where the resulting plasma regions are typically of cylindrical geometry, while the repetition rate of the pulses is in the range between 1 kHz and 1 MHz. The ensuing strong overlapping leads to the formation of seemingly continuous weld lines by the inscription of discrete localized junctions, in a process that limits the generation of adverse thermal effects.

In some embodiments, the method according to an aspect of the present invention may further include an additional step of thermally annealing the joined optical components. This slow annealing process is used to further reinforce a direct bond following the inscription of weld lines, but it may also help minimizing the change in refractive index induced by exposure of the optical components to ultrashort laser pulses. However, as those skilled in the art will readily understand, such an annealing treatment may not be suitable for the direct-bonded combination of two dissimilar materials whose thermal dilatation coefficients exhibit a large difference in value.

In preferred embodiments of the invention, such as shown in FIG. 6A, the optical axis 38 along which the ultrashort laser pulses 32 propagate is substantially perpendicular to the direct-bonded interface 30. Alternatively, in other embodiments, the optical axis 38 is tilted with respect to a normal 48 to the plane defined by the direct-bonded interface 30, as exemplified in FIG. 6B. It should be noted that in this tilted configuration, the ultrashort laser pulses 32 may enter the first optical component 22 through the top surface thereof, as for the embodiment shown FIG. 6B, but also through a side surface thereof (not shown).

According to another aspect of the invention, there is provided another method for joining together a first and a second optical component, each of the first and second optical components having a respective bonding surface, the respective bonding surfaces having matching boundaries, that is, they have identical sizes and shapes and are mirror images of each other. Preferably, the first and second optical components have substantially identical optical parameters, wherein the term "optical parameters" is understood in this context to include at least the transmittance and the non-linear refractive index $n_2$ of the first and second optical components.

The method according to this aspect of the invention first includes a step of aligning the boundaries of the respective bonding surfaces of the first and second optical components and assembling the first and second optical components by direct bonding of their respective bonding surfaces, thereby defining a direct-bonded interface therebetween. This step of the method can be accomplished as described above for other embodiments of the invention, with reference to FIGS. 1A and 1B. The method further includes a step of reinforcement of the direct-bonded interface with a weld seam including at least one substantially continuous reinforcing weld line forming a closed shape enclosing a sealed direct-bonded region. In typical embodiments, the sealed direct-bonded region has a shape that is substantially identical to that of the respective matching bonding surfaces.

Referring now to FIGS. 8A and 8B, this reinforcement step first includes, for each of the at least one weld line 42, propagating ultrashort laser pulses 32 along an optical axis 38 lying substantially in a plane defined by the direct-bonded interface 30, the laser pulses 32 having a spectral bandwidth within which both the first and second optical components 22 and 24 are substantially transparent. In the illustrated embodiment, since the respective bounding surfaces 26 and 28 of the two optical components 22 and 24 have matching and aligned boundaries, each of the one or more side surfaces of the first optical component lies substantially in a same plane as a corresponding one of the one or more side surfaces of the second optical component 24, thereby defining one or more common side surfaces 33 on which the ultrashort laser pulses 32 impinge, as shown in FIGS. 8A and 8B.

A focusing element 34 is preferably used to focus the ultrashort laser pulses 32 to a focal spot 36 positioned precisely in the plane of the direct-bonded interface 30, as shown in FIG. 8C. The peak power of the laser pulses 32 is controlled so as to reach a threshold for self-focusing given by equation (1). As self-focusing develops, the peak intensity of the pulses 32 increases sufficiently to trigger non-linear absorption of the laser energy followed by non-linear ionization of the irradiated materials and is formation of a plasma channel by optical filaments 37 centered substantially in the plane of the direct-bonded interface 30. Due to its finite radius, the plasma channel spreads out slightly inside the two optical components 22 and 24, so as to modify matter in a very localized and smooth manner on both sides of the direct-bonded interface 30 and induce a localized junction 40 reinforcing the direct bond between the first and second optical components 22 and 24, as shown in FIG. 8C.

Referring now to FIGS. 8B and 8D, the method also includes translating the focal spot 36 of the laser pulses 32 with respect to the direct-bonded interface 30 in a pattern defining the closed shape, so as to inscribe a weld seam 46 including at least one substantially continuous reinforcing weld line 42 forming a close shape enclosing a sealed direct-bonded region 44. The at least one weld line 42 defines a weld seam 46 reinforcing the direct-bonded interface 30, thereby resulting in a reinforced optical assembly 20, as shown in FIG. 8D. In preferred embodiments, both the sealed direct-bonded region 44 enclosed by a weld seam 46 and the respective bonding surfaces 26 and 28 of the first and second optical components 22 and 24 can be substantially rectangular (FIG. 8D), square or circular in shape. The sealed direct-bonded region 44 may possess rounded corners if the respective bonding surfaces 26 and 28 of two optical components 22 and 24 also exhibit such geometry.

As those skilled in art will readily understood, in the embodiments according to this method of the invention, the step of translating the focal spot 36 of the pulses 32 so as to inscribe at least one weld line 42 is performed while keeping as much as possible the optical axis 38 of the pulses 32 and the direct-bonded interface 30 in a same plane. Those skilled in the art will also readily understand that in the configuration shown in FIGS. 8A to 8D, the ultrashort pulsed laser welding process according to the present invention requires that proper care should be given to ensure that the quality and planarity of common side surfaces 33 are appropriate.

According to a further aspect of the invention, there is provided a reinforced optical assembly. Referring now more specifically to FIGS. 1A to 1F, the reinforced optical assembly 20 includes a first optical component 22 joined together with a second optical component 24, each of the first and second optical components 22 and 24 having a respective bonding surface 26 and 28. The first and second optical components 22 and 24 are assembled by direct bonding of the respective bonding surfaces 26 and 28 thereof together, thereby defining a direct-bonded interface 30 therebetween.

It will be understood by those skilled in the art that the optical components 22 and 24 forming the reinforced optical assembly 20 may be made up of any solid, non-plastically deformed material, provided that at least the first optical component is substantially transparent to the wavelength of the laser. As long as this requirement is fulfilled, each of the first and second optical components 22 and 24 may thus be made up of single elements (e.g. Si, Ag, Al), compounds or organic compounds.

Typical non-limiting examples of such compounds are glasses, crystals, metals, semiconductors, polymers and organic polymeric compounds such as polycarbonate, polytetrafluoroethylene (known under the trademark Teflon), and the like. It is an advantage of the present invention that the first and second optical components 22 and 24 forming the reinforced optical assembly 20 of embodiments of the invention can but need not be of a same type.

It will also be understood that the first and second optical components 22 and 24 can have various physical parameters such as their shape, size, bonding surface area and thickness, and that these physical parameters can but need not be the same for both components.

It will further be understood that the process of direct bonding employed to assemble the first and second optical components 22 and 24 may have been performed according to embodiments of the present invention as described above.

Referring now to FIGS. 1F and 5A to 5E, the reinforced optical assembly 20 according to embodiments of the present invention also includes a weld seam 46 reinforcing the direct-bonded interface 30. The weld seam includes at least one substantially continuous reinforcing weld line 42 forming a closed shape enclosing a sealed direct-bonded region 44. Each of the at least one weld line 42 have been obtained by following the steps of the method described above and illustrated in FIGS. 1C to 1F.

The sealed direct-bonded region 44 enclosed by a weld seam 46 may be of different shapes including, but not limited to, substantially rectangular (FIG. 5A), square (FIG. 5B) or circular (FIG. 5C). In these or other embodiments, the sealed direct-bonded region 44 may possess rounded corners (FIGS. 5D and 5E). Preferably, as exemplified by the embodiments of FIGS. 5C, 5D and 5E, the weld seam 46 defines a sealed direct-bonded region 44 having a circular or rounded-corner shape, which allows inscribing each of the at least one weld line 42 comprising the weld seam 46 with less starting and stopping points, thereby limiting build-up of constraints and crack initiation from corners in the reinforced assembly 20.

In some embodiments, the at least one substantially continuous reinforcing weld line 42 preferably includes a plurality of substantially continuous reinforcing weld lines 42, as illustrated in FIG. 5E, since the multiplication of weld lines 42 upon a direct-bonded interface 30 reinforces the mechanical strength of the optical assembly 20. Also preferably, the at least one substantially continuous reinforcing weld line 42 may be inscribed along an outer edge of the direct-bonded interface 30, as for the embodiments shown in FIGS. 5A, 5C and 5D. Advantageously, the inscription of weld lines 42 along the outer edge of the direct-bonded interface 30 will maximize the size of the sealed direct-bonded region 44 wherein the optical transmission properties of the reinforced optical assembly 20 are not affected by the material's density change occurring in the vicinity of the weld seam 46. However, depending on the intended use of the resulting reinforced optical assembly 20 the sealed direct-bonded region 44 may cover only a portion of the joined optical components 22 and 24 without departing from the scope of the present invention.

Optionally, some embodiments of the invention may include at least one additional reinforcing weld line 47 inscribed inside the sealed direct-bonded region 44, thereby reinforcing the central part of thereof. In particular, the direct-bonded interface 30 may be reinforced by multiplying weld lines 47 inside the sealed direct-bonded region 44, for example by inscribing successive parallel and equally spaced weld lines 47 along one direction in the plane of the direct-bonded interface 30, as shown in FIG. 5F. It is to be noted, however, that inscribing such additional weld lines 47 inside the sealed direct-bonded region 44 may not be appropriate in embodiments wherein the optical transmission properties of the reinforced optical assembly 20 should remain unaffected by the ultrashort pulsed laser welding.

According to yet another aspect of the invention, there is provided a reinforced optical assembly. Referring now more specifically to FIGS. 1A, 1B and 8A to 8D, the reinforced optical 20 assembly includes a first optical component 22 joined together with a second optical component 24, each of the first and second optical components 22 and 24 having a respective bonding surface 26 and 28, the respective bonding surfaces 26 and 28 having matching and aligned boundaries. The first and second optical components 22 and 24 are assembled by direct bonding of the respective bonding surfaces 26 and 28 thereof together, thereby defining a direct-bonded interface 30 therebetween.

It will be understood by those skilled in the art that the optical components 22 and 24 forming the reinforced optical assembly 20 may be made up of any solid, substantially transparent and non-plastically deformed material. Each of the first and second optical components 22 and 24 may thus be made up of single elements (e.g. Si, Ag, Al), compounds or organic compounds. Typical non-limiting examples of such compounds are glasses, crystals, metals, semiconductors, polymers and organic polymeric compounds such as polycarbonate, polytetrafluoroethylene (known under the trademark Teflon), and the like. Preferably, the first and second optical components 22 and 24 have substantially identical optical parameters.

It will further be understood that the process of direct bonding employed to assemble the first and second optical components 22 and 24 may have been performed according to embodiments of the present invention as described above.

Referring now to FIG. 8D, the reinforced optical assembly 20 according to embodiments of the present invention also includes a weld seam 46 reinforcing the direct-bonded interface 30. The weld seam 46 includes at least one substantially continuous reinforcing weld line 42 forming a closed shape enclosing a sealed direct-bonded region 44. In typical embodiments, the sealed direct-bonded region 44 has a shape that is substantially identical to that of the respective matching bonding surfaces. Each of the at least one weld line 42 have been obtained by following the steps of the method described above and illustrated in FIGS. 8A to 8D, wherein the optical axis 38 of the ultrashort laser pulses 32 used to reinforce the direct bond between the first and second optical components 22 and 24 lies substantially in the plane of the direct-bonded interface 30 to be reinforced.

Preferably, both the sealed direct-bonded region 44 enclosed by a weld seam 46 and the respective bonding surfaces of the first and second optical components 22 and 24 and can define various shapes including, but not limited to, substantially rectangular (FIG. 8D), square or circular. In these or other embodiments, the sealed direct-bonded region 44 may also possess rounded corners.

In some embodiments, the at least one substantially continuous reinforcing weld line 42 preferably includes a plurality of substantially continuous reinforcing weld lines 42, since the multiplication of weld lines 42 upon a direct-bonded interface 30 reinforces the mechanical strength of the optical assembly 20. Also preferably, the at least one substantially continuous reinforcing weld line 42 may be inscribed along an outer edge of the direct-bonded interface 30. Advantageously, the inscription of weld lines 42 along the outer edge of the direct-bonded interface 30 will maximize the size of the sealed direct-bonded region 44 wherein the optical transmission properties of the reinforced optical assembly 20 are not affected by the material's density change occurring in the vicinity of the weld seam 46. However, depending on the intended use of the resulting reinforced optical assembly 20 the sealed direct-bonded region 44 may cover only a portion of the joined optical components 22 and 24 without departing from the scope of the present invention.

Experimental Demonstration

FIG. 3 shows a picture of a reinforced optical assembly obtained by the method according to the present invention and consisting of a fused silica plate joined to a silicon wafer using the method of the present invention. The resulting sealed direct-bonded region has an area of 8×13 mm$^2$ and was inscribed by raster scanning the sample at speed of 1 mm/s in the plane perpendicular to the optical axis of the pulses in order to write each side of the weld seam. A lens having a 15-mm effective focal length was used to focus ultrashort laser pulses (wavelength of 789 nm, pulse energy of 500 nJ, pulse duration at FWHM of 50 fs and repetition rate of 250 kHz) at a geometrical focal point positioned slightly inside the silicon.

As explained above, since embodiments of the present invention rely on the formation of optical filaments with finite lengths, it proves to be less sensitive to the positioning of the focal spot than other methods. Embodiments of the present invention may be used to join optical components of several millimeters in thickness, as exemplified in FIGS. 2, 3 and 7. The maximum eligible thickness for the first optical component is limited by the effective focal length of the laser focusing element, which may be adjusted accordingly as long as the peak power of the laser pulses allows self-focusing and plasma formation at the interface between the first and second optical components. Proof of this concept was demonstrated using two plates of fused silica substrates having each a thickness of 2.3 mm, as shown in FIG. 2B, where direct bonding was initially achieved on an area of 10×15 mm$^2$, which corresponds to the whole area of the bonding surfaces between the two optical components. A region occupying at least 1 cm$^2$ of the direct-bonded interface was subsequently sealed by exposure to ultrashort laser pulses, the sealing being realized without affecting the transmission properties at the center of the sealed region.

Figure 7A:
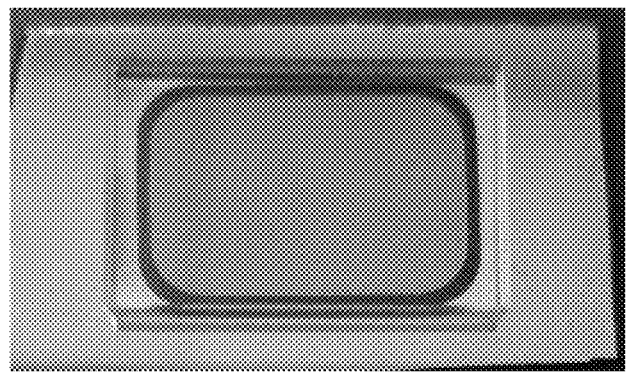
FIGS. 7A and 7B are photographs of a reinforced optical assembly according to embodiments of the present invention, wherein a direct bond between fused silica and silicon was reinforced following laser exposure so as to inscribe a rectangular shaped weld seam having rounded corners and including 100 weld lines (FIG. 7A) and a circular shaped weld seam including 50 weld lines (FIG. 7B), respectively.
Figure 7B:
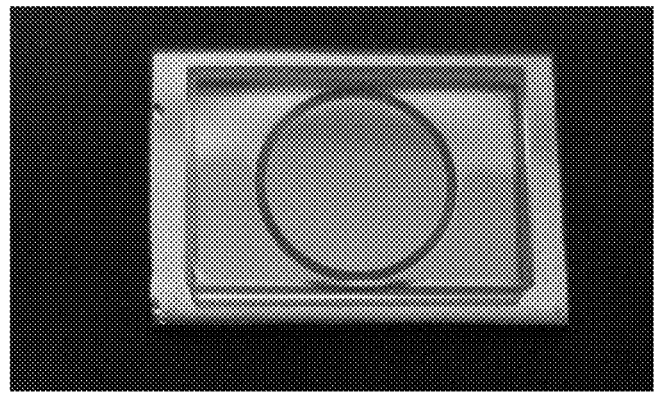

Referring now to FIGS. 7A and 7B, there are shown reinforced optical assemblies according to embodiments of the present invention, wherein a direct bond between fused silica and silicon was reinforced following laser exposure. FIGS. 7A and 7B thus illustrate how the method of the present invention can be applied to join dissimilar materials. In FIG. 7A, ultrashort laser pulses were used to inscribe 100 weld lines defining a weld seam enclosing a sealed direct-bonded region having a rectangular shape with rounded corners. Likewise, in FIG. 7B, ultrashort laser pulses were used to inscribe 50 weld lines defining a weld seam enclosing a sealed direct-bonded region having a circular shape.

Figure 9A:
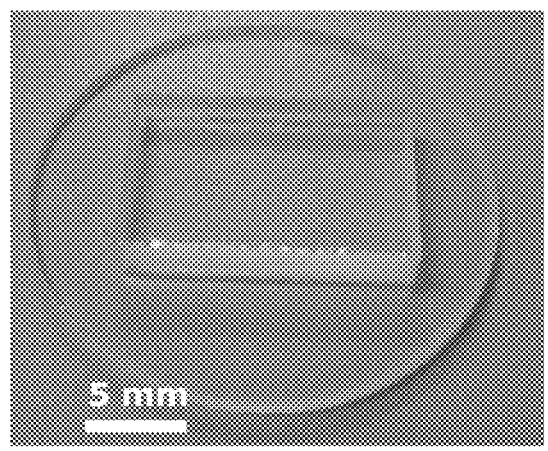
FIGS. 9A and 9B show photographs of substantially transparent similar and dissimilar materials direct-bonded and further reinforced by ultrashort laser pulses, according to embodiments of the present invention. The assemblies are composed of fused silica and BK7 glass (FIG. 9A) and yttrium aluminium garnet crystals (FIG. 9B).
Figure 9B:
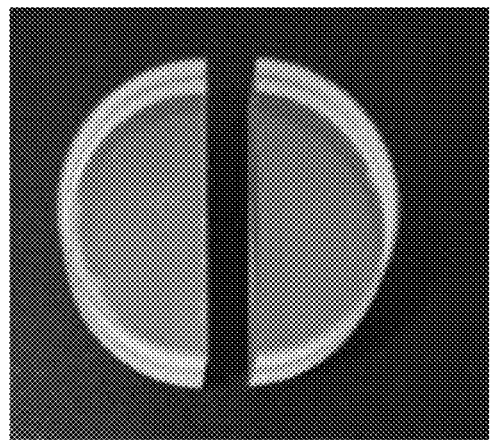

FIGS. 9A and 9B illustrate samples of similar and dissimilar substantially transparent materials which were joined according to embodiments of the invention. In FIG. 9A, a 10×15 mm$^2$ fused silica window was direct-bonded to a one-inch diameter BK7 glass window. Subsequently, ultrashort laser pulses were used to inscribe reinforcing weld lines at a distance of 0.5 mm from the outer edge of the fused silica window, producing a rectangular shaped sealed direct-bonded region. FIG. 9B shows two undoped yttrium aluminum garnet (YAG) blanks which were first direct-bonded together and subsequently reinforced with 10 circular shaped weld lines. The sample was then cut in half perpendicularly to the direct-bonded interface for allowing observation of the cross-section of the weld lines and for testing its resistance to mechanical processing. These types of reinforced optical assemblies are most suitable in applications where a refractive index change, an air gap or other bonding alterations must be avoided in order to conserve the optical properties of light passing through the assembly.

Optionally, some embodiments of the present invention may further include, prior to the step of assembling the first and second optical components, a preliminary step of performing a surface treatment on the respective bonding surface of at least one of the first and second optical components. This surface treatment may include, for example and without limitation, depositing an optical coating on the respective bonding surface of at least one of the first and second optical components.

Figure 10B:
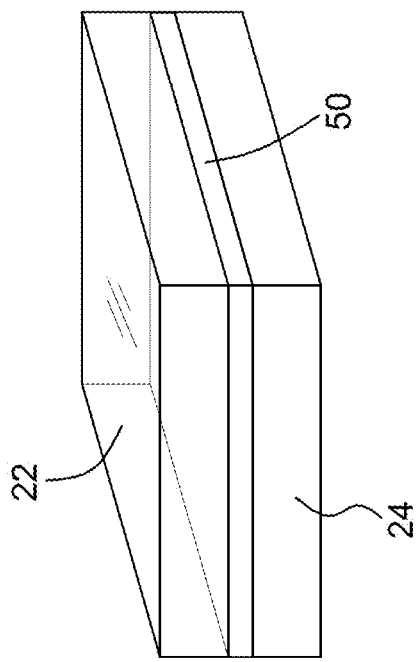
FIGS. 10A and 10B illustrate schematically an embodiment of the present invention, wherein an optical coating is deposited on the bonding surface of the first optical component (FIG. 10A) prior to the direct bonding of the respective bonding surfaces of the first and second optical components (FIG. 10B).
Figure 10A:
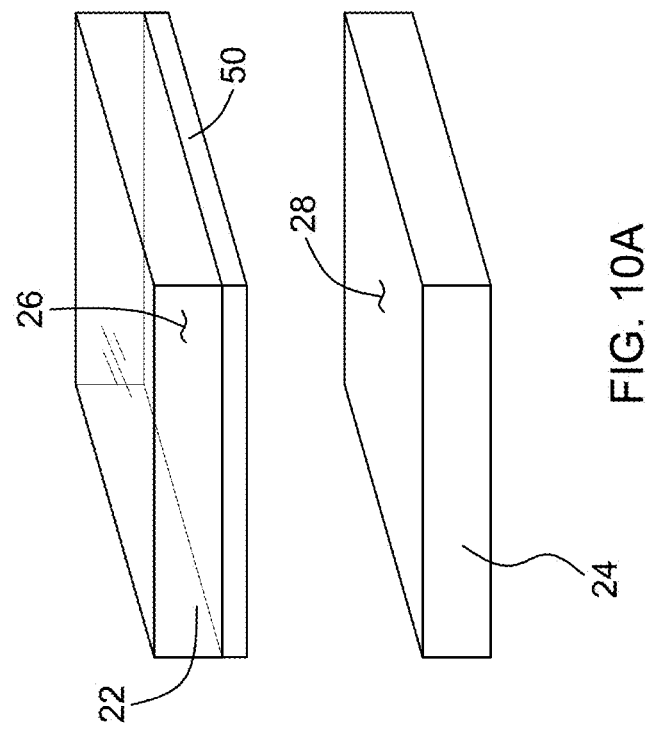

FIGS. 10A and 10B illustrates schematically another embodiment of the present invention, wherein an optical coating 50 is deposited on the bonding surface 26 of the first optical component 22 (FIG. 10A) prior to the direct bonding of the respective bonding surfaces 26 and 28 of the first and second optical components 22 and 24 together (FIG. 10B). Alternatively or additionally, an optical coating 50 may be also deposited on the bonding surface 28 of the second optical component 24 prior to assembling of the two optical components 22 and 24 by direct bonding thereof.

Figure 11:
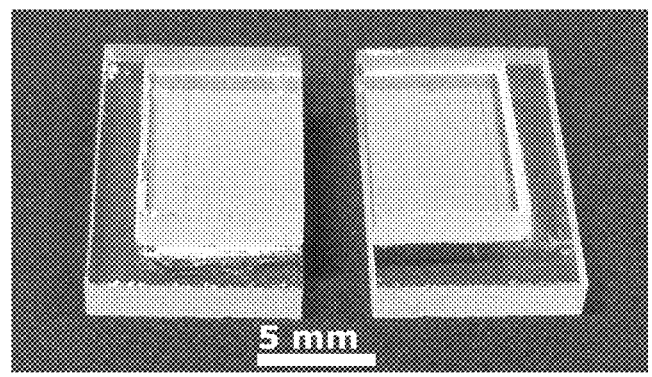
FIG. 11 is a photograph of a reinforced optical assembly according to an embodiment of the present invention, wherein a thin optical coating made of alternate layers of $TiO_2$ and $SiO_2$ was deposited on a fused silica plate and the coated side thereof was direct-bonded to another fused silica plate and further reinforced by ultrashort laser pulses.
Figure 12:
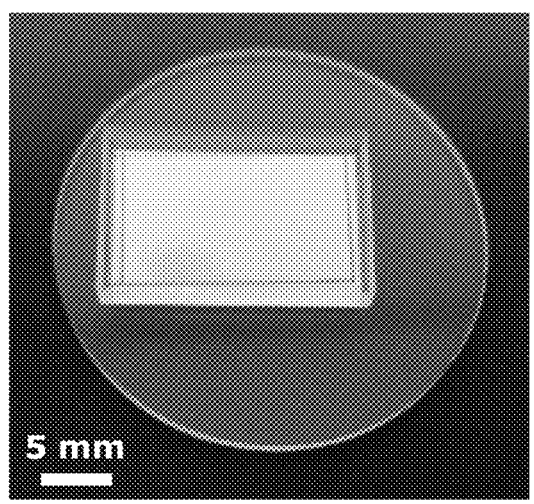
FIG. 12 is a photograph of a reinforced optical assembly according to an embodiment of the present invention, wherein a thin optical coating made of alternate layers of $TiO_2$ and $SiO_2$ was deposited on a fused silica plate and the coated side thereof was direct-bonded to a BK7 glass window and further reinforced by ultrashort laser pulses.
Figure 13:
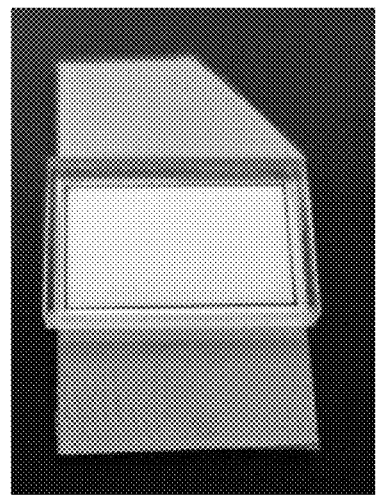
FIG. 13 is a photograph of a reinforced optical assembly according to an embodiment of the present invention, wherein a thin optical coating made of alternate layers of TiO$_2$ and SiO$_2$ was deposited on a fused silica plate and the coated side thereof was direct-bonded to a silicon wafer and further reinforced by ultrashort laser pulses.
Figure 14:
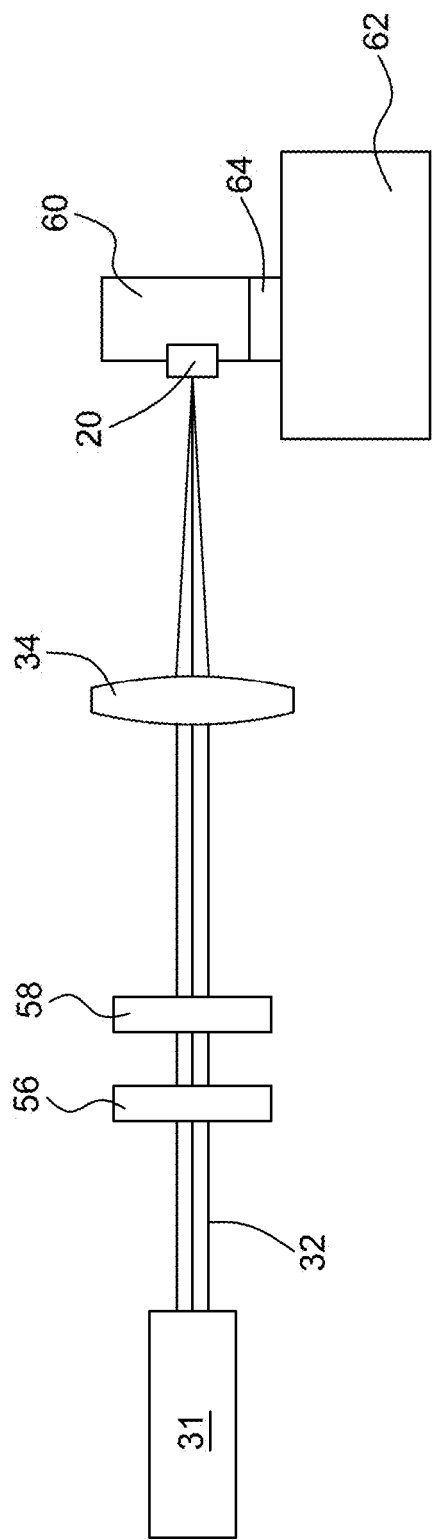
FIG. 14 illustrates schematically an experimental setup used for reinforcing a direct-bonded interface by ultrashort pulsed laser welding according to an embodiment of the present invention.

In the embodiments shown in FIGS. 11 to 13, a thin optical coating was deposited on the bonding surface of a fused silica window prior to the joining of the coated bonded surface thereof, to similar and dissimilar materials according to a method of the present invention. The coating is composed of alternate layers of titanium dioxide ($TiO_2$) and silicon dioxide ($SiO_2$), the final surface state of which was carefully engineered to permit direct bonding. In FIG. 11, the coating deposited on fused silica was direct-bonded to another fused silica window, followed by laser reinforcement of the resulting optical assembly. The sample was then cut in two using a dicing saw and the slice of the cut was polished. This treatment was applied to verify the resistance of the reinforced optical assembly to typical mechanical processing. In FIGS. 12 and 13, the same coating was deposited on a fused silica window, which was subsequently joined by direct bonding to a BK7 window and a silicon wafer, respectively. A rectangular sealing pattern by laser welding was then inscribed along the outer edge of the direct-bonded region. The embodiments shown in FIGS. 11 to 13 demonstrate that the method according to the present invention can be applied to various combinations of similar and dissimilar materials. The main interest of embodiments of the invention such as those shown in FIGS. 11 to 13 resides in the possibility to seal or protect an optical coating from ambient conditions which could otherwise deteriorate its performance. A further application of the method may be to assembly various types of materials in such a "sandwich" configuration.

Examples of Applications

Multiple applications of the method of direct bonding of optical components reinforced with ultrafast laser pulses can be conceived in a wide array of domains. Below is a non-exhaustive list of current and foreseen practical applications of the embodiments of the invention:

Joining of optical components for applications in which the final reinforced optical assembly must not contain any adhesive agent. For example, in aerospace applications, assemblies are subjected to harsh environmental constraints and adhesives are a source of contamination and of early aging of the bonds.

Realization of precise micro-optical junctions in photoemissive semiconductors, laser diodes and electroluminescent diodes.

Protection of photovoltaic cells (solar cells) with a glass plate covering.

Assembly of optical components for high-power emission devices which may be directly joined to the emission sources, such as, for example, a setup subjected to high-power laser emission and thermal constraints, characteristically to laser diode stacks and achromatic doublets.

Joining of materials in a "sandwich" configuration, composed of doped and non-doped material, for use in the assembling of disk lasers, semiconductor stacks and laser gain medium.

Protection of hydrophilic materials by the bonding of a damp proof glass which is substantially transparent to the spectral content of the intended application.

Sealing of a micro-structured optical fiber in order to avoid gas or particle intrusion.

Assembly of a macro-crystal by bonding of smaller crystalline structures.

Reinforcement of an optical cavity pre-assembled using direct bonding such as, for example, a Fabry-Perot or a compact laser pumping cavity.

Protection and sealing of thin optical coatings between two solid materials, wherein the coating is sensitive to ambient conditions or may be subjected to a harsh environment. For example, the assembly and protection of beam splitters, etalons, mirrors, wave plates, dichroic filters, dichroic mirrors and prisms may benefit from this bonding process.

Splicing of optical fibers made of similar or dissimilar glasses.

Any application field where optimal surface quality is needed and direct bonding is used, wherein the direct bond would benefit from being reinforced in order to withstand important mechanical, thermal and atmospheric constraints while maintaining optimal optical transmission properties.

Of course, numerous modifications could be made to the embodiments described above without departing from the scope of the present invention.

The invention claimed is:

1. A method for joining together a first and a second optical component, each or said first and second optical components having a respective bonding surface, the method comprising the steps of:
   a) assembling the first and second optical components by direct bonding of the respective bonding surfaces thereof together, thereby defining a direct-bonded interface therebetween; and
   b) reinforcing said direct-bonded interface with a weld seam comprising at least one reinforcing weld line forming a closed shape enclosing a sealed direct-bonded region, said sealed direct-bonded region forming an optical transmission window, said reinforcing comprising, for each of said at least one weld line, the steps of:
      1) propagating ultrashort laser pulses along an optical axis through the first optical component toward the direct-bonded interface, the ultrashort laser pulses having a spectral bandwidth within which at least the first optical component is substantially transparent, focusing said ultrashort laser pulses on a focal spot inside the second optical component near the direct-bonded interface and controlling a peak power and a repetition rate of said ultrashort laser pulses at the direct-bonded interface so as to form, through a balance between self-focusing and plasma defocusing of said ultrashort laser pulses, an optical filament across the direct-bonded interface said optical filament creating a plasma channel that induces a localized junction between said first and second optical components; and
      2) translating the focal spot of the ultrashort laser pulses with respect to the direct-bonded interface in a pattern defining said closed shape.

2. The method claim 1, wherein the step of translating the focal spot of the ultrashort laser pulses with respect to the direct-bonded interface is performed at a scan speed that is adjusted with the repetition rate of the ultrashort laser pulses so as to produce said at least one reinforcing weld line.

3. The method according to claim 1, wherein the at least one reinforcing weld line comprises a plurality of reinforcing weld lines.

4. The method according to claim 1, wherein the at least one reinforcing weld line is inscribed along an outer edge of the direct-bonded interface.

5. The method according to claim 1, wherein the sealed direct bonded region has rounded corners.

6. The method according to claim 1, wherein at least one additional reinforcing weld line is inscribed inside the sealed direct-bonded region.

7. The method according to claim 1, further comprising, prior to the step of assembling the first and second optical components, a preliminary step of performing a surface treatment on the respective bonding surface of at least one of the first and second optical components.

8. The method according to claim 7, wherein the preliminary step of performing a surface treatment comprises depositing an optical coating on the respective bonding surface of at least one of the first and second optical components.

9. A method for joining together a first and a second optical component, each of said first and second optical components having a respective bonding surface, the respective bonding surfaces having matching boundaries, the method comprising the steps of:
  a) aligning the boundaries of the respective bonding surfaces of the first and second optical components and assembling said first and second optical components by direct bonding of the respective bonding surfaces thereof together, thereby defining a direct-bonded interface therebetween; and
  b) reinforcing said direct-bonded interface with a weld seam comprising at least one reinforcing weld line forming a closed shape enclosing a sealed direct-bonded region, said sealed direct-bonded region forming an optical transmission window, said reinforcing comprising, for each of said at least one weld line, the steps of:
    1) propagating ultrashort laser pulses along an optical axis lying substantially in a plane defined by the direct-bonded interface, the ultrashort laser pulses having a spectral bandwidth within which the first and the second optical components are substantially transparent, focusing said ultrashort laser pulses on a focal spot positioned along the direct-bonded interface, and controlling a peak power and a repetition rate of said ultrashort laser pulses at the direct-bonded interface so as to form, through a balance between self-focusing and plasma defocusing of said ultrashort laser pulses, an optical filament along the direct-bonded interface, said optical filament creating a plasma channel that induces a localized junction between said first and second optical components; and
    2) translating the focal spot of the ultrashort laser pulses with respect to the direct-bonded interface in a pattern defining said closed shape.

10. The method according to claim 9, wherein the step of translating the focal spot of the ultrashort laser pulses with respect to the direct-bonded interface is performed at a scan speed that is adjusted according to the repetition rate of the ultrashort laser pulses so as to produce said at least one reinforcing weld line.

11. The method according to claim 9, wherein the least one reinforcing weld line comprises a plurality of weld lines.

12. The method according to claim 9, wherein the at least one reinforcing weld line is inscribed along an outer edge of the direct-bonded interface.

13. The method according to claim 9, wherein the respective bonding surfaces of the first and second optical components and the sealed direct-bonded region have rounded corners.

14. The method according to claim 9, further comprising, prior to the step of assembling the first and second optical components, a preliminary step of performing a surface treatment on the respective bonding surface of at least one of the first and second optical components.

15. The method according to claim 14, wherein the preliminary step of performing a surface treatment comprises depositing an optical coating on the respective bonding surface of at least one of the first and second optical components.

* * * * *